United States Patent
Tanaka

(10) Patent No.: US 10,926,737 B2
(45) Date of Patent: Feb. 23, 2021

(54) EXTRA-VEHICULAR COMMUNICATION DEVICE, COMMUNICATION CONTROL METHOD, AND COMMUNICATION CONTROL PROGRAM

(71) Applicant: SUMITOMO ELECTRIC INDUSTRIES, LTD., Osaka (JP)

(72) Inventor: Yuya Tanaka, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/618,211

(22) PCT Filed: May 23, 2018

(86) PCT No.: PCT/JP2018/019739
§ 371 (c)(1),
(2) Date: Nov. 29, 2019

(87) PCT Pub. No.: WO2018/230280
PCT Pub. Date: Dec. 20, 2018

(65) Prior Publication Data
US 2020/0086827 A1    Mar. 19, 2020

(30) Foreign Application Priority Data
Jun. 14, 2017   (JP) .............................. JP2017-116857

(51) Int. Cl.
*B60R 25/30*     (2013.01)
*B60R 25/043*    (2013.01)
(Continued)

(52) U.S. Cl.
CPC ............ *B60R 25/043* (2013.01); *B60R 25/30* (2013.01); *G05D 1/0061* (2013.01);
(Continued)

(58) Field of Classification Search
CPC ........ B60R 25/043; B60R 25/30; H04W 4/48; H04W 4/90; H04W 76/50; H04W 12/06; G05D 1/0061; G05D 1/0214; G07C 5/008
See application file for complete search history.

(56) References Cited

U.S. PATENT DOCUMENTS

| 5,081,667 A * | 1/1992 | Drori ..................... B60R 25/104 |
| | | 290/38 C |
| 9,015,439 B1 * | 4/2015 | Verhaeghe ............ G06F 12/123 |
| | | 711/163 |

(Continued)

FOREIGN PATENT DOCUMENTS

| JP | 2005-11101 A | 1/2005 |
| JP | 2013-168865 A | 8/2013 |

(Continued)

OTHER PUBLICATIONS

Virtual Private Network, "Wikipedia", [online], [Searched on Jan. 16, 2017], Internet <URL: http://ja.wikipedia.org/wiki/Virtual_Private_Network>.

(Continued)

*Primary Examiner* — Nay Tun
(74) *Attorney, Agent, or Firm* — Oliff PLC

(57) ABSTRACT

An extra-vehicular communication device installed in a vehicle and capable of communicating with an external device outside the vehicle includes: a control unit; and a storage unit that has a tamper-resistant secure area and stores, in the secure area, at least one of communication destination information regarding a communication destination outside the vehicle and emergency operation information regarding a predetermined operation in an emergency. When unauthorized access in in-vehicle equipment installed in the vehicle is detected, the control unit performs at least one of control of communication with the communication (Continued)

destination by use of the communication destination information and processing based on the emergency operation information.

12 Claims, 14 Drawing Sheets

(51) Int. Cl.
| | |
|---|---|
| *H04W 4/48* | (2018.01) |
| *H04W 4/90* | (2018.01) |
| *H04W 76/50* | (2018.01) |
| *G05D 1/00* | (2006.01) |
| *G05D 1/02* | (2020.01) |
| *G07C 5/00* | (2006.01) |
| *H04W 12/06* | (2021.01) |

(52) U.S. Cl.
CPC ........... *G05D 1/0214* (2013.01); *G07C 5/008* (2013.01); *H04W 4/48* (2018.02); *H04W 4/90* (2018.02); *H04W 12/06* (2013.01); *H04W 76/50* (2018.02)

(56) References Cited

U.S. PATENT DOCUMENTS

| | | | | |
|---|---|---|---|---|
| 9,451,020 | B2* | 9/2016 | Liu | H04W 4/44 |
| 9,866,542 | B2* | 1/2018 | Baltes | H04W 12/1208 |
| 10,150,448 | B2* | 12/2018 | Huennekens | G08B 21/22 |
| 10,275,366 | B2* | 4/2019 | Pandy | G06F 12/1441 |
| 10,489,612 | B2* | 11/2019 | Frank | G06F 21/44 |
| 10,726,138 | B2* | 7/2020 | Nakamura | G06F 21/604 |
| 2002/0166034 | A1* | 11/2002 | Koschella | G06F 12/1433 |
| | | | | 711/152 |
| 2008/0178292 | A1* | 7/2008 | Stauner | G06F 12/1441 |
| | | | | 726/23 |
| 2012/0208492 | A1* | 8/2012 | Tschofenig | H04M 3/5116 |
| | | | | 455/404.2 |
| 2014/0136414 | A1* | 5/2014 | Abhyanker | G06Q 10/087 |
| | | | | 705/44 |
| 2015/0202770 | A1* | 7/2015 | Patron | G06Q 20/384 |
| | | | | 700/245 |
| 2016/0070934 | A1* | 3/2016 | Frank | G06F 21/79 |
| | | | | 711/103 |
| 2016/0071418 | A1* | 3/2016 | Oshida | B60W 30/165 |
| | | | | 701/23 |
| 2016/0085695 | A1* | 3/2016 | Leslie-Hurd | G06F 21/79 |
| | | | | 711/163 |
| 2016/0219028 | A1* | 7/2016 | Baltes | H04L 63/1408 |
| 2016/0224476 | A1* | 8/2016 | Pandy | G07C 5/085 |
| 2016/0283896 | A1* | 9/2016 | Dziurda | G06Q 10/087 |
| 2016/0323287 | A1* | 11/2016 | Kishikawa | H04L 12/40013 |
| 2017/0030725 | A1* | 2/2017 | Gordon | G01C 21/3492 |
| 2017/0123423 | A1* | 5/2017 | Sako | G06Q 30/0645 |
| 2017/0139844 | A1* | 5/2017 | Zavalney | G06F 12/1441 |
| 2018/0204015 | A1* | 7/2018 | Nakamura | G06F 21/604 |
| 2018/0217942 | A1* | 8/2018 | Fons | G06F 12/1408 |
| 2018/0349612 | A1* | 12/2018 | Harel | G06F 21/554 |

FOREIGN PATENT DOCUMENTS

| | | |
|---|---|---|
| JP | 2013-187555 A | 9/2013 |
| JP | 2017-26105 A | 2/2017 |

OTHER PUBLICATIONS

Tamper Resistance, "IT Glossary e-Words", [online], [searched on May 1, 2017], Internet <URL: http://e-words.jp/w/tamper resistance. html>.

Nakamura, Tomohisa et al., A Proposal of Access Control Model Using Tamper-Resistant Devices Based on Multi-Level Security, Computer Security Symposium Series, Oct. 20, 2004, vol. 2004. No. 11, pp. 649-654.

Aug. 21, 2018 Search Report issued in International Patent Application No. PCT/JP2018/019739.

Aug. 21, 2018 Written Opinion issued in International Patent Application No. PCT/JP2018/019739.

\* cited by examiner

EXTRA-VEHICULAR COMMUNICATION DEVICE, COMMUNICATION CONTROL METHOD, AND COMMUNICATION CONTROL PROGRAM

TECHNICAL FIELD

The present invention relates to an extra-vehicular communication device, a communication control method, and a communication control program.

This application claims priority based on Japanese Patent Application No. 2017-116857 filed on Jun. 14, 2017, the entire disclosure of which is incorporated herein.

BACKGROUND ART

Patent Literature 1 (Japanese Patent Laid-Open No. 2013-168865) discloses an in-vehicle network system as follows. That is, the in-vehicle network system includes: an in-vehicle controller provided with a memory that stores definition data defining a portion of communication protocol used in an in-vehicle network, the portion being dependent on implementation on the in-vehicle network; and a communication protocol issuing device that issues the definition data to the in-vehicle controller. When the communication protocol issuing device receives, from a registration device that causes the in-vehicle controller to participate in the in-vehicle network, a registration request for requesting participation of the in-vehicle controller in the in-vehicle network, the communication protocol issuing device performs authentication for the registration device, creates the definition data dependent on the implementation on the in-vehicle network, and returns the definition data to the registration device. The registration device receives the definition data transmitted by the communication protocol issuing device, and requests the in-vehicle controller to store the received definition data into the memory. Then, the in-vehicle controller receives the definition data from the registration device, stores the definition data into the memory and performs communication dependent on the communication protocol by use of the in-vehicle network in accordance with the portion defined by the definition data.

CITATION LIST

Patent Literature

Patent Literature 1: Japanese Patent Laid-Open No. 2013-168865

Non-Patent Literature

Non-Patent Literature 1: "Wikipedia", [online], [Searched on Jan. 16, 2017], Internet <URL: http://ja.wikipedia.org/wiki/Virtual_Private_Network>

Non-Patent Literature 2: "IT Glossary e-Words", [online], [searched on May 1, 2017], Internet <URL: http://e-words.jp/w/tamper resistance.html>

SUMMARY OF INVENTION (1) An extra-vehicular communication device of the present disclosure is an extra-vehicular communication device installed in a vehicle and capable of communicating with an external device outside the vehicle, the extra-vehicular communication device including: a control unit; and a storage unit that has a tamper-resistant secure area and stores, in the secure area, at least one of communication destination information regarding a communication destination outside the vehicle and emergency operation information regarding a predetermined operation in an emergency. When unauthorized access in in-vehicle equipment installed in the vehicle is detected, the control unit performs at least one of control of communication with the communication destination by use of the communication destination information and processing based on the emergency operation information (2) An extra-vehicular communication device of the present disclosure is an extra-vehicular communication device installed in a vehicle and capable of communicating with an external device outside the vehicle, the extra-vehicular communication device including: a storage unit that stores normal-time operation information regarding a predetermined operation in a normal time; a main control unit that performs processing based on the normal-time operation information; a secure storage unit that has a tamper-resistant secure area and stores, in the secure area, at least one of communication destination information regarding a communication destination outside the vehicle and emergency operation information regarding a predetermined operation in an emergency; and a secure control unit that is capable of accessing the secure area and performs, instead of the main control unit, at least one of control of communication with the communication destination by use of the communication destination information and processing based on the emergency operation information when unauthorized access in in-vehicle equipment installed in the vehicle is detected.

(3) An extra-vehicular communication device of the present disclosure is an extra-vehicular communication device installed in a vehicle and capable of communicating with an external device outside the vehicle, the extra-vehicular communication device including: a control unit; and a storage unit that has a secure area to which access from the control unit is permitted when the control unit outputs predetermined information, the storage unit storing, in the secure area, at least one of communication destination information regarding a communication destination outside the vehicle and emergency operation information regarding a predetermined operation in an emergency. When unauthorized access in in-vehicle equipment installed in the vehicle is detected, the control unit performs at least one of control of communication with the communication destination by use of the communication destination information and processing based on the emergency operation information.

(4) An extra-vehicular communication device of the present disclosure is an extra-vehicular communication device installed in a vehicle and capable of communicating with an external device outside the vehicle, the extra-vehicular communication device including: a storage unit that stores normal-time operation information regarding a predetermined operation in a normal time; a main control unit that performs processing based on the normal-time operation information; a secure storage unit that has a secure area and stores, in the secure area, at least one of communication destination information regarding a communication destination outside the vehicle and emergency operation information regarding a predetermined operation in an emergency; and a secure control unit that is capable of accessing the secure area and performs, instead of the main control unit, at least one of control of communication with the communication destination by use of the communication destination information and processing based on the emergency operation information when unauthorized access in in-vehicle equipment installed in the vehicle is detected.

(13) A communication control method of the present disclosure is a communication control method in an extra-vehicular communication device that is installed in a vehicle, is capable of communicating with an external device outside the vehicle, and includes a storage unit and a control unit. The storage unit has a tamper-resistant secure area and stores, in the secure area, at least one of communication destination information regarding a communication destination outside the vehicle and emergency operation information regarding a predetermined operation in an emergency, and the method includes the steps of: acquiring from the storage unit at least one of the communication destination information and the emergency operation information regarding a predetermined operation in an emergency when unauthorized access in in-vehicle equipment installed in the vehicle is detected, and performing at least one of control of communication with the communication destination by use of the acquired communication destination information and processing based on the acquired emergency operation information.

(14) A communication control method of the present disclosure is a communication control method in an extra-vehicular communication device that is installed in a vehicle, is capable of communicating with an external device outside the vehicle, and includes a storage unit, a secure storage unit, a main control unit, and a secure control unit. The storage unit stores normal-time operation information regarding a predetermined operation in a normal time, the secure storage unit has a tamper-resistant secure area and stores, in the secure area, at least one of communication destination information regarding a communication destination outside the vehicle and emergency operation information regarding a predetermined operation in an emergency, the secure control unit is capable of accessing the secure area, and the method includes the steps of: by the main control unit, performing processing based on the normal-time operation information, and by the secure control unit, performing, instead of the main control unit, at least one of control of communication with the communication destination by use of the communication destination information and processing based on the emergency operation information when unauthorized access in in-vehicle equipment installed in the vehicle is detected.

(15) A communication control method of the present disclosure is a communication control method in an extra-vehicular communication device that is installed in a vehicle, is capable of communicating with an external device outside the vehicle, and includes a storage unit and a control unit. The storage unit has a secure area to which access from the control unit is permitted when the control unit outputs predetermined information, and stores, in the secure area, at least one of communication destination information regarding a communication destination outside the vehicle and emergency operation information regarding a predetermined operation in an emergency, the method includes the steps of: acquiring from the storage unit at least one of the communication destination information and the emergency operation information regarding a predetermined operation in an emergency, when unauthorized access in in-vehicle equipment installed in the vehicle is detected, and performing at least one of control of communication with the communication destination by use of the acquired communication destination information and processing based on the acquired emergency operation information.

(16) A communication control method of the present disclosure is a communication control method in an extra-vehicular communication device that is installed in a vehicle, is capable of communicating with an external device outside the vehicle, and includes a storage unit, a secure storage unit, a main control unit, and a secure control unit. The storage unit stores normal-time operation information regarding a predetermined operation in a normal time, the secure storage unit has a secure area and stores, in the secure area, at least one of communication destination information regarding a communication destination outside the vehicle and emergency operation information regarding a predetermined operation in an emergency, the secure control unit is capable of accessing the secure area, and the method including the steps of: by the main control, performing processing based on the normal-time operation information, and by the secure control unit, performing, instead of the main control unit, at least one of control of communication with the communication destination by use of the communication destination information and processing based on the emergency operation information when an unauthorized access in in-vehicle equipment installed in the vehicle is detected.

(17) A communication control program of the present disclosure is a program used in an extra-vehicular communication device that is installed in a vehicle, is capable of communicating with an external device outside the vehicle, and includes a storage unit and a control unit. The storage unit has a tamper-resistant secure area and stores, in the secure area, at least one of communication destination information regarding a communication destination outside the vehicle and emergency operation information regarding a predetermined operation in an emergency, and the program causes a computer to function as the control unit that performs at least one of control of communication with the communication destination by use of the communication destination information and processing based on the emergency operation information when unauthorized access in in-vehicle equipment installed in the vehicle is detected.

(18) A communication control program of the present disclosure is a program used in an extra-vehicular communication device that is installed in a vehicle, is capable of communicating with an external device outside the vehicle, and includes a storage unit and a secure storage unit. The storage unit stores normal-time operation information regarding a predetermined operation in a normal time the secure storage unit has a tamper-resistant secure area and stores, in the secure area, at least one of communication destination information regarding a communication destination outside the vehicle and emergency operation information regarding a predetermined operation in an emergency, and the program causes a computer to function as a main control unit that performs processing based on the normal-time operation information, and a secure control unit that is capable of accessing the secure area and performs, instead of the main control unit, at least one of control of communication with the communication destination by use of the communication destination information and processing based on the emergency operation information when unauthorized access in in-vehicle equipment installed in the vehicle is detected.

(19) A communication control program of the present disclosure is a program used in an extra-vehicular communication device that is installed in a vehicle, is capable of communicating with an external device outside the vehicle, and includes a storage unit and a control unit. The storage unit has a secure area to which access from the control unit is permitted when the control unit outputs predetermined information and stores, in the secure area, at least one of communication destination information regarding a communication destination outside the vehicle and emergency operation information regarding a predetermined operation in an emergency, and the program causes a computer to function as the control unit that performs at least one of control of communication with the communication destination by use of the communication destination information and processing based on the emergency operation information when unauthorized access in in-vehicle equipment installed in the vehicle is detected.

(20) A communication control program of the present disclosure is a program used in an extra-vehicular communication device that is installed in a vehicle, is capable of communicating with an external device outside the vehicle, and includes a storage unit and a secure storage unit. The storage unit stores normal-time operation information regarding a predetermined operation in a normal time, the secure storage unit has a secure area and stores, in the secure area, at least one of communication destination information regarding a communication destination outside the vehicle and emergency operation information regarding a predetermined operation in an emergency, and the program causes a computer to function as a main control unit that performs processing based on the normal-time operation information, and a secure control unit that is capable of accessing the secure area and performs, instead of the main control unit, at least one of control of communication with the communication destination by use of the communication destination information and processing based on the emergency operation information when unauthorized access in in-vehicle equipment installed in the vehicle is detected.

One aspect of the present disclosure can be realized not only as an extra-vehicular communication device including such a characteristic processing unit, but also as an in-vehicle communication system including an extra-vehicular communication device. In addition, the present invention can be realized as a semiconductor integrated circuit that realizes a part or the entire of the extra-vehicular communication device.

DESCRIPTION OF EMBODIMENTS

Figure 1:
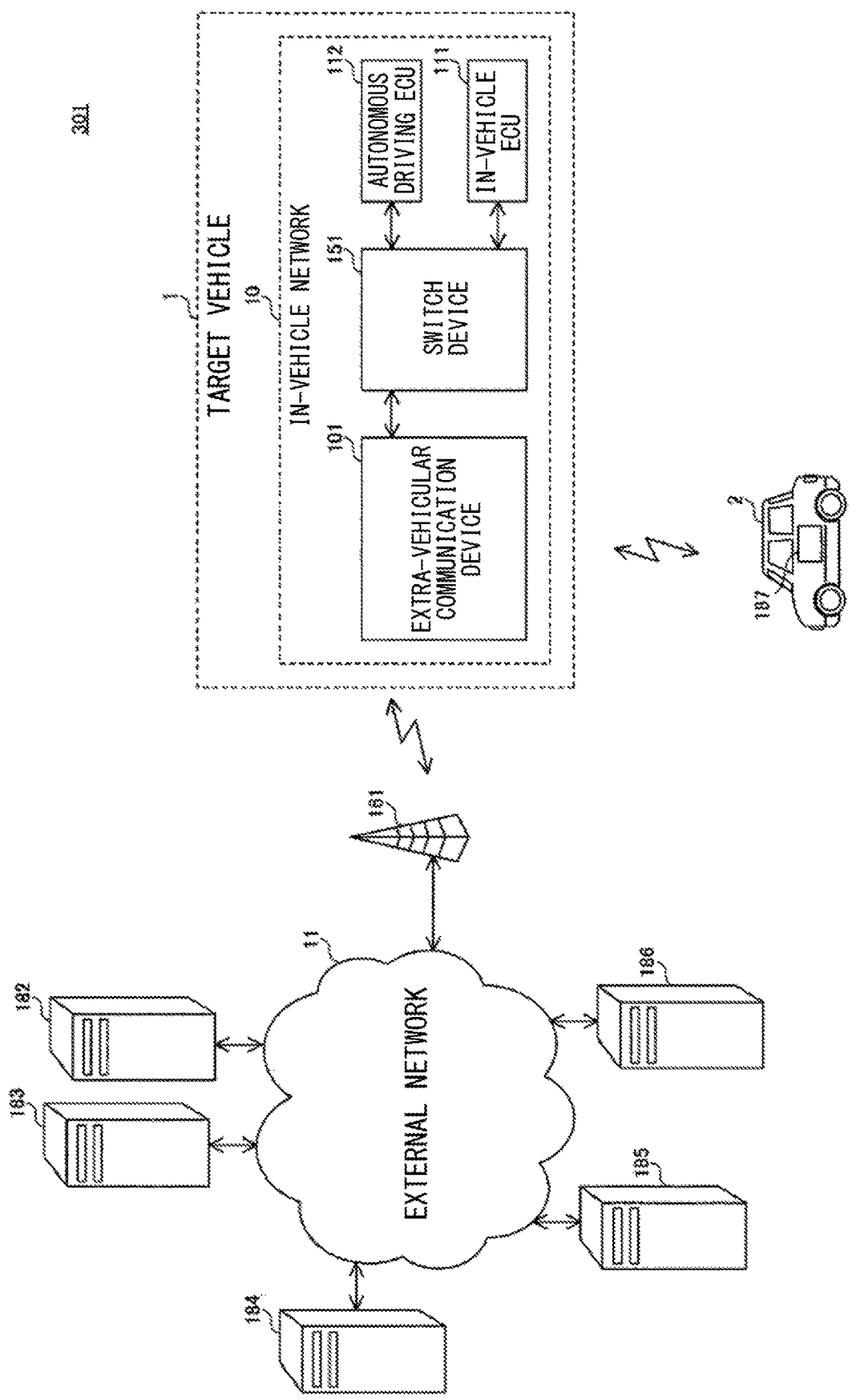
FIG. 1 is a diagram showing a configuration of an in-vehicle communication system according to a first embodiment of the present invention.

Conventionally, an in-vehicle network system for improving security in an in-vehicle network has been developed.

Problem to be Solved by the Present Disclosure

For example, when the in-vehicle network described in Patent Literature 1 is connected to an external network outside the vehicle, an extra-vehicular communication device for communicating with the external network may be provided in the vehicle. In this case, it is conceivable that the extra-vehicular communication device may receive an unauthorized access such as hacking from the outside of the vehicle, and a technique for performing appropriate processing as the extra-vehicular communication device is required when such unauthorized access is received.

The present disclosure has been made in order to solve the problem described above, and an object of the present disclosure is to provide an extra-vehicular communication device, a communication control method, and a communication control program that is capable of performing appropriate processing more reliably even when unauthorized access is received in an in-vehicle network Effect of Present Disclosure According to the present disclosure, appropriate processing can be more reliably performed even when unauthorized access is received in the in-vehicle network.

DESCRIPTION OF EMBODIMENTS

First, the contents of the embodiments of the present invention will be listed and described.

(1) An extra-vehicular communication device according to an embodiment of the present invention is an extra-vehicular communication device installed in a vehicle and capable of communicating with an external device outside the vehicle, the extra-vehicular communication device including: a control unit; and a storage unit that has a tamper-resistant secure area and stores, in the secure area, at least one of communication destination information regarding a communication destination outside the vehicle and emergency operation information regarding a predetermined operation in an emergency. When unauthorized access in in-vehicle equipment installed in the vehicle is detected, the control unit performs at least one of control of communication with the communication destination by use of the communication destination information and processing based on the emergency operation information As thus described, for example, with the configuration where at least one of the communication destination information and the emergency operation information necessary for processing that should be performed when unauthorized access is received is stored in the secure area that is difficult to rewrite from the outside of the vehicle, even when unauthorized access is received, information that is free of worry about rewriting due to unauthorized access can be acquired from the secure area, so that it is possible to reliably perform at least one of communication with the assumed communication destination and assumed processing. Therefore, in the in-vehicle network, appropriate processing can be more reliably performed even when unauthorized access is received. In addition, when unauthorized access is received, with the configuration to perform communication with the communication destination by use of the communication destination information, it is possible to ensure transmission of information necessary to deal with the unauthorized access as compared to, for example, a configuration where communication with the external device is completely blocked when unauthorized access is received.

(2) An extra-vehicular communication device according to an embodiment of the present invention is an extra-vehicular communication device installed in a vehicle and capable of communicating with an external device outside the vehicle, the extra-vehicular communication device including: a storage unit that stores normal-time operation information regarding a predetermined operation in a normal time; a main control unit that performs processing based on the normal-time operation information; a secure storage unit that has a tamper-resistant secure area and stores, in the secure area, at least one of communication destination information regarding a communication destination outside the vehicle and emergency operation information regarding a predetermined operation in an emergency; and a secure control unit that is capable of accessing the secure area and performs, instead of the main control unit, at least one of control of communication with the communication destination by use of the communication destination information and processing based on the emergency operation information when unauthorized access in in-vehicle equipment installed in the vehicle is detected.

As thus described, for example, with the configuration where at least one of the communication destination information and the emergency operation information necessary for processing that should be performed when unauthorized access is received is stored in the secure area accessible by the secure control unit and the secure control unit performs control instead of the main control unit when unauthorized access is detected, even when unauthorized access is received, the secure control unit that is difficult for an unauthorized operation from the outside can reliably perform at least one of communication with the assumed communication destination and the assumed processing by use of the information in the secure area that is free of worry about rewriting due to access. Therefore, in the in-vehicle network, appropriate processing can be more reliably performed even when unauthorized access is received. In addition, when unauthorized access is received, with the configuration to perform communication with the communication destination by use of the communication destination information, it is possible to ensure transmission of information necessary to deal with the unauthorized access as compared to, for example, a configuration where communication with the external device is completely blocked when unauthorized access is received.

(3) An extra-vehicular communication device according to an embodiment of the present invention is an extra-vehicular communication device installed in a vehicle and capable of communicating with an external device outside the vehicle, the extra-vehicular communication device including: a control unit; and a storage unit that has a secure area to which access from the control unit is permitted when the control unit outputs predetermined information, the storage unit storing, in the secure area, at least one of communication destination information regarding a communication destination outside the vehicle and emergency operation information regarding a predetermined operation in an emergency. When unauthorized access in in-vehicle equipment installed in the vehicle is detected, the control unit performs at least one of control of communication with the communication destination by use of the communication destination information and processing based on the emergency operation information.

As thus described, for example, with the configuration where at least one of the communication destination information and the emergency operation information necessary for processing that should be performed when unauthorized access is received is stored in the secure area that is difficult to rewrite from the outside of the vehicle, even when unauthorized access is received, information that is free of worry about rewriting due to unauthorized access can be acquired from the secure area, so that it is possible to reliably perform at least one of communication with the assumed communication destination and assumed processing. Therefore, in the in-vehicle network, appropriate processing can be more reliably performed even when unauthorized access is received. In addition, when unauthorized access is received, with the configuration to perform communication with the communication destination by use of the communication destination information, it is possible to ensure transmission of information necessary to deal with the unauthorized access as compared to, for example, a configuration where communication with the external device is completely blocked when unauthorized access is received.

(4) An extra-vehicular communication device according to an embodiment of the present invention is an extra-vehicular communication device installed in a vehicle and capable of communicating with an external device outside the vehicle, the extra-vehicular communication device including: a storage unit that stores normal-time operation information regarding a predetermined operation in a normal time; a main control unit that performs processing based on the normal-time operation information; a secure storage unit that has a secure area and stores, in the secure area, at least one of communication destination information regarding a communication destination outside the vehicle and emergency operation information regarding a predetermined operation in an emergency; and a secure control unit that is capable of accessing the secure area and performs, instead of the main control unit, at least one of control of communication with the communication destination by use of the communication destination information and processing based on the emergency operation information when unauthorized access in in-vehicle equipment installed in the vehicle is detected.

As thus described, for example, with the configuration where at least one of the communication destination information and the emergency operation information necessary for processing that should be performed when unauthorized access is received is stored in the secure area accessible by the secure control unit and the secure control unit performs control instead of the main control unit when unauthorized access is detected, even when unauthorized access is received, the secure control unit that is difficult for an unauthorized operation from the outside can reliably perform at least one of communication with the assumed communication destination and the assumed processing by use of the information in the secure area that is free of worry about rewriting due to access. Therefore, in the in-vehicle network, appropriate processing can be more reliably performed even when unauthorized access is received. In addition, when unauthorized access is received, with the configuration to perform communication with the communication destination by use of the communication destination information, it is possible to ensure transmission of information necessary to deal with the unauthorized access as compared to, for example, a configuration where communication with the external device is completely blocked when unauthorized access is received.

(5) Preferably, the communication destination is the external device that transmits information necessary for autonomous driving of the vehicle.

With such a configuration, transmission of information exchanged with the external device that transmits information necessary for autonomous driving of the vehicle can be ensured, thereby contributing to the continuation of autonomous driving of the vehicle when unauthorized access is received.

(6) Preferably, the communication destination is the external device of an emergency-report receiving organization.

With such a configuration, it is possible to more reliably notify the emergency-report receiving organization that the vehicle has received unauthorized access, and the like.

(7) Preferably, the communication destination indicates a broadcast.

For example, in a case where a communication destination is specified, when it is difficult for the communication destination to receive information from the extra-vehicular communication device, information cannot be transmitted from the extra-vehicular communication device to the outside of the vehicle. On the other hand, with the configuration as described above where the communication destination is not specified, it is possible to more reliably transmit information to the outside of the vehicle.

(8) More preferably, information indicating that the vehicle receives the unauthorized access is broadcast as communication with the communication destination.

With such a configuration, it is possible to broadcast to any device that the vehicle has received unauthorized access.

(9) Preferably, the predetermined operation in an emergency is communication with at least one of the external device and the in-vehicle equipment.

With such a configuration, even in a situation where unauthorized access likely to impair communication reliability is received, it is possible to perform communication satisfactorily with at least one of the external device and the in-vehicle equipment based on the emergency operation information in the secure area that is free of worry about rewriting due to unauthorized access.

(10) Preferably, the predetermined operation in an emergency is switching from autonomous driving to manual driving of the vehicle.

As thus described, in a situation where unauthorized access likely to impair the reliability of autonomous driving of the vehicle is received, with the configuration to switch from the autonomous driving to manual driving, the driver can control the vehicle, and it is thus possible to maintain satisfactory driving of the vehicle even when unauthorized access is received.

(11) Preferably, the predetermined operation in an emergency is stopping the vehicle on a road shoulder.

As thus described, in a situation where unauthorized access likely to impair the reliability of the autonomous driving of the vehicle is received, with the configuration where the vehicle is stopped on a road shoulder, it is possible to ensure the safety of the vehicle and prevent continuation of the autonomous driving with low reliability.

(12) Preferably, the secure area is included in a storage area of a secure device.

As described above, for example, with the configuration to use the secure area in a general-purpose secure device, it is possible to easily ensure the secure area in the extra-vehicular communication device.

(13) A communication control method according to an embodiment of the present invention is a communication control method in an extra-vehicular communication device that is installed in a vehicle, is capable of communicating with an external device outside the vehicle, and includes a storage unit and a control unit. The storage unit has a tamper-resistant secure area and stores, in the secure area, at least one of communication destination information regarding a communication destination outside the vehicle and emergency operation information regarding a predetermined operation in an emergency, and the method includes the steps of: acquiring from the storage unit at least one of the communication destination information and the emergency operation information regarding a predetermined operation in an emergency when unauthorized access in in-vehicle equipment installed in the vehicle is detected, and performing at least one of control of communication with the communication destination by use of the acquired communication destination information and processing based on the acquired emergency operation information.

As thus described, for example, with the configuration where at least one of the communication destination information and the emergency operation information necessary for processing that should be performed when unauthorized access is received is stored in the secure area that is difficult to rewrite from the outside of the vehicle, even when unauthorized access is received, information that is free of worry about rewriting due to unauthorized access can be acquired from the secure area, so that it is possible to reliably perform at least one of communication with the assumed communication destination and assumed processing. Therefore, in the in-vehicle network, appropriate processing can be more reliably performed even when unauthorized access is received. In addition, when unauthorized access is received, with the configuration to perform communication with the communication destination by use of the communication destination information, it is possible to ensure transmission of information necessary to deal with the unauthorized access as compared to, for example, a configuration where communication with the external device is completely blocked when unauthorized access is received.

(14) A communication control method according to an embodiment of the present invention is a communication control method in an extra-vehicular communication device that is installed in a vehicle, is capable of communicating with an external device outside the vehicle, and includes a storage unit, a secure storage unit, a main control unit, and a secure control unit. The storage unit stores normal-time operation information regarding a predetermined operation in a normal time, the secure storage unit has a tamper-resistant secure area and stores, in the secure area, at least one of communication destination information regarding a communication destination outside the vehicle and emergency operation information regarding a predetermined operation in an emergency, the secure control unit is capable of accessing the secure area, and the method includes the steps of: the secure control unit performing processing based on the normal-time operation information, and the secure control unit performing, instead of the main control unit, at least one of control of communication with the communication destination by use of the communication destination information and processing based on the emergency operation information when unauthorized access in in-vehicle equipment installed in the vehicle is detected.

As thus described, for example, with the configuration where at least one of the communication destination information and the emergency operation information necessary for processing that should be performed when unauthorized access is received is stored in the secure area accessible by the secure control unit and the secure control unit performs control instead of the main control unit when unauthorized access is detected, even when unauthorized access is received, the secure control unit that is difficult for an unauthorized operation from the outside can reliably perform at least one of communication with the assumed communication destination and the assumed processing by use of the information in the secure area that is free of worry about rewriting due to access. Therefore, in the in-vehicle network, appropriate processing can be more reliably performed even when unauthorized access is received. In addition, when unauthorized access is received, with the configuration to perform communication with the communication destination by use of the communication destination information, it is possible to ensure transmission of information necessary to deal with the unauthorized access as compared to, for example, a configuration where communication with the external device is completely blocked when unauthorized access is received.

(15) A communication control method according to an embodiment of the present invention is a communication control method in an extra-vehicular communication device that is installed in a vehicle, is capable of communicating with an external device outside the vehicle, and includes a storage unit and a control unit. The storage unit has a secure area to which access from the control unit is permitted when the control unit outputs predetermined information, and stores, in the secure area, at least one of communication destination information regarding a communication destination outside the vehicle and emergency operation information regarding a predetermined operation in an emergency, the method includes the steps of: acquiring from the storage unit at least one of the communication destination information and the emergency operation information regarding a predetermined operation in an emergency, when unauthorized access in in-vehicle equipment installed in the vehicle is detected, and performing at least one of control of communication with the communication destination by use of the acquired communication destination information and processing based on the acquired emergency operation information.

As thus described, for example, with the configuration where at least one of the communication destination information and the emergency operation information necessary for processing that should be performed when unauthorized access is received is stored in the secure area that is difficult to rewrite from the outside of the vehicle, even when unauthorized access is received, information that is free of worry about rewriting due to unauthorized access can be acquired from the secure area, so that it is possible to reliably perform at least one of communication with the assumed communication destination and assumed processing. Therefore, in the in-vehicle network, appropriate processing can be more reliably performed even when unauthorized access is received. In addition, when unauthorized access is received, with the configuration to perform communication with the communication destination by use of the communication destination information, it is possible to ensure transmission of information necessary to deal with the unauthorized access as compared to, for example, a configuration where communication with the external device is completely blocked when unauthorized access is received.

(16) A communication control method according to an embodiment of the present invention is a communication control method in an extra-vehicular communication device that is installed in a vehicle, is capable of communicating with an external device outside the vehicle, and includes a storage unit, a secure storage unit, a main control unit, and a secure control unit. The storage unit stores normal-time operation information regarding a predetermined operation in a normal time, the secure storage unit has a secure area and stores, in the secure area, at least one of communication destination information regarding a communication destination outside the vehicle and emergency operation information regarding a predetermined operation in an emergency, the secure control unit is capable of accessing the secure area, and the method including the steps of: the main control performing processing based on the normal-time operation information, and the secure control unit performing, instead of the main control unit, at least one of control of communication with the communication destination by use of the communication destination information and processing based on the emergency operation information when an unauthorized access in in-vehicle equipment installed in the vehicle is detected.

As thus described, for example, with the configuration where at least one of the communication destination information and the emergency operation information necessary for processing that should be performed when unauthorized access is received is stored in the secure area accessible by the secure control unit and the secure control unit performs control instead of the main control unit when unauthorized access is detected, even when unauthorized access is received, the secure control unit that is difficult for an unauthorized operation from the outside can reliably perform at least one of communication with the assumed communication destination and the assumed processing by use of the information in the secure area that is free of worry about rewriting due to access. Therefore, in the in-vehicle network, appropriate processing can be more reliably performed even when unauthorized access is received. In addition, when unauthorized access is received, with the configuration to perform communication with the communication destination by use of the communication destination information, it is possible to ensure transmission of information necessary to deal with the unauthorized access as compared to, for example, a configuration where communication with the external device is completely blocked when unauthorized access is received.

(17) A communication control program according to an embodiment of the present invention is a program used in an extra-vehicular communication device that is installed in a vehicle, is capable of communicating with an external device outside the vehicle, and includes a storage unit and a control unit. The storage unit has a tamper-resistant secure area and stores, in the secure area, at least one of communication destination information regarding a communication destination outside the vehicle and emergency operation information regarding a predetermined operation in an emergency, and the program causes a computer to function as the control unit that performs at least one of control of communication with the communication destination by use of the communication destination information and processing based on the emergency operation information when unauthorized access in in-vehicle equipment installed in the vehicle is detected.

As thus described, for example, with the configuration where at least one of the communication destination information and the emergency operation information necessary for processing that should be performed when unauthorized access is received is stored in the secure area that is difficult to rewrite from the outside of the vehicle, even when unauthorized access is received, information that is free of worry about rewriting due to unauthorized access can be acquired from the secure area, so that it is possible to reliably perform at least one of communication with the assumed communication destination and assumed processing. Therefore, in the in-vehicle network, appropriate processing can be more reliably performed even when unauthorized access is received. In addition, when unauthorized access is received, with the configuration to perform communication with the communication destination by use of the communication destination information, it is possible to ensure transmission of information necessary to deal with the unauthorized access as compared to, for example, a configuration where communication with the external device is completely blocked when unauthorized access is received.

(18) A communication control program according to an embodiment of the present invention is a program used in an extra-vehicular communication device that is installed in a vehicle, is capable of communicating with an external device outside the vehicle, and includes a storage unit and a secure storage unit. The storage unit stores normal-time operation information regarding a predetermined operation in a normal time the secure storage unit has a tamper-resistant secure area and stores, in the secure area, at least one of communication destination information regarding a communication destination outside the vehicle and emergency operation information regarding a predetermined operation in an emergency, and the program causes a computer to function as a main control unit that performs processing based on the normal-time operation information, and a secure control unit that is capable of accessing the secure area and performs, instead of the main control unit, at least one of control of communication with the communication destination by use of the communication destination information and processing based on the emergency operation information when unauthorized access in in-vehicle equipment installed in the vehicle is detected.

As thus described, for example, with the configuration where at least one of the communication destination information and the emergency operation information necessary for processing that should be performed when unauthorized access is received is stored in the secure area accessible by the secure control unit and the secure control unit performs control instead of the main control unit when unauthorized access is detected, even when unauthorized access is received, the secure control unit that is difficult for an unauthorized operation from the outside can reliably perform at least one of communication with the assumed communication destination and the assumed processing by use of the information in the secure area that is free of worry about rewriting due to access. Therefore, in the in-vehicle network, appropriate processing can be more reliably performed even when unauthorized access is received. In addition, when unauthorized access is received, with the configuration to perform communication with the communication destination by use of the communication destination information, it is possible to ensure transmission of information necessary to deal with the unauthorized access as compared to, for example, a configuration where communication with the external device is completely blocked when unauthorized access is received.

(19) A communication control program according to an embodiment of the present invention is a program used in an extra-vehicular communication device that is installed in a vehicle, is capable of communicating with an external device outside the vehicle, and includes a storage unit and a control unit. The storage unit has a secure area to which access from the control unit is permitted when the control unit outputs predetermined information and stores, in the secure area, at least one of communication destination information regarding a communication destination outside the vehicle and emergency operation information regarding a predetermined operation in an emergency, and the program causes a computer to function as the control unit that performs at least one of control of communication with the communication destination by use of the communication destination information and processing based on the emergency operation information when unauthorized access in in-vehicle equipment installed in the vehicle is detected.

As thus described, for example, with the configuration where at least one of the communication destination information and the emergency operation information necessary for processing that should be performed when unauthorized access is received is stored in the secure area that is difficult to rewrite from the outside of the vehicle, even when unauthorized access is received, information that is free of worry about rewriting due to unauthorized access can be acquired from the secure area, so that it is possible to reliably perform at least one of communication with the assumed communication destination and assumed processing. Therefore, in the in-vehicle network, appropriate processing can be more reliably performed even when unauthorized access is received. In addition, when unauthorized access is received, with the configuration to perform communication with the communication destination by use of the communication destination information, it is possible to ensure transmission of information necessary to deal with the unauthorized access as compared to, for example, a configuration where communication with the external device is completely blocked when unauthorized access is received.

(20) A communication control program according to an embodiment of the present invention is a program used in an extra-vehicular communication device that is installed in a vehicle, is capable of communicating with an external device outside the vehicle, and includes a storage unit and a secure storage unit. The storage unit stores normal-time operation information regarding a predetermined operation in a normal time, the secure storage unit has a secure area and stores, in the secure area, at least one of communication destination information regarding a communication destination outside the vehicle and emergency operation information regarding a predetermined operation in an emergency, and the program causes a computer to function as a main control unit that performs processing based on the normal-time operation information, and a secure control unit that is capable of accessing the secure area and performs, instead of the main control unit, at least one of control of communication with the communication destination by use of the communication destination information and processing based on the emergency operation information when unauthorized access in in-vehicle equipment installed in the vehicle is detected.

As thus described, for example, with the configuration where at least one of the communication destination information and the emergency operation information necessary for processing that should be performed when unauthorized access is received is stored in the secure area accessible by the secure control unit and the secure control unit performs control instead of the main control unit when unauthorized access is detected, even when unauthorized access is received, the secure control unit that is difficult for an unauthorized operation from the outside can reliably perform at least one of communication with the assumed communication destination and the assumed processing by use of the information in the secure area that is free of worry about rewriting due to access. Therefore, in the in-vehicle network, appropriate processing can be more reliably performed even when unauthorized access is received. In addition, when unauthorized access is received, with the configuration to perform communication with the communication destination by use of the communication destination information, it is possible to ensure transmission of information necessary to deal with the unauthorized access as compared to, for example, a configuration where communication with the external device is completely blocked when unauthorized access is received.

Hereinafter, the embodiments of the present invention will be described with reference to the drawings. In the drawings, the same or corresponding portions are denoted by the same reference numerals, and description thereof will not be repeated. At least a part of each embodiment described below may be combined in a freely selectable manner.

First Embodiment

[Configuration and Basic Operation]
FIG. 1 is a diagram showing a configuration of an in-vehicle communication system according to a first embodiment of the present invention.

Referring to FIG. 1, an in-vehicle communication system 301 includes an extra-vehicular communication device 101, an in-vehicle electronic control unit (ECU) 111, an autonomous driving ECU 112, and a switch device 151. The in-vehicle communication system 301 is installed in a target vehicle 1.

The extra-vehicular communication device 101, the in-vehicle ECU 111, the autonomous driving ECU 112, and the switch device 151 are examples of in-vehicle equipment.

The switch device 151 is connected to the extra-vehicular communication device 101, the in-vehicle ECU 111, and the autonomous driving ECU 112 to form an in-vehicle network 10.

Note that the in-vehicle equipment is not limited to these specific examples, but may be another device so long as being equipment installed in the target vehicle 1.

The extra-vehicular communication device 101 can communicate with an external device outside the target vehicle 1. Specifically, the extra-vehicular communication device 101 can be communicated with, for example, a radio base station device 161, a report destination server 182, a carrier server 183, a map server 184, a control server 185, a general server 186, and an in-vehicle communication device 187 in another vehicle 2, which are examples of the external device.

Each of the report destination server 182, the carrier server 183, the map server 184, the control server 185, and the general server 186 is, for example, a server capable of performing communication in accordance with the internet protocol (IP) protocol. Hereinafter, each of these servers is also referred to as an IP server.

Note that the external device is not limited to these specific examples, but may be another device so long as being a device provided outside the target vehicle 1.

The report destination server 182 is, for example, a server operated by an emergency-report receiving organization such as a police agency or a fire engine and can accept an emergency-report from a wireless communication device such as the extra-vehicular communication device 101.

The carrier server 183 is, for example, a server operated by a communication carrier, and by authenticating the wireless communication device such as the extra-vehicular communication device 101, the carrier server 183 enables the wireless communication device to access an external network 11 via the radio base station device 161.

The map server 184 and the control server 185, for example, transmit information necessary for the autonomous driving of the target vehicle 1.

More specifically, the map server 184 transmits, for example, map information indicating a map based on absolute coordinates to the wireless communication device such as the extra-vehicular communication device 101.

The control server 185 transmits, for example, control information, such as remote autonomous driving information for autonomously driving an unmanned vehicle from a remote position, and a guidance instruction information for safely stopping the vehicle at a designated position, specifically a road shoulder or the like, by the autonomous driving, to the wireless communication device such as the extra-vehicular communication device 101.

The general server 186 transmits, for example, text information, image information, moving image information, audio information, and the like to the wireless communication device such as the extra-vehicular communication device 101 in response to a request from the wireless communication device.

The switch device 151 is, for example, a layer 2 (L2) switch, and in conformity with the communication standard of Ethernet (registered trademark), the switch device 151 performs relay processing on an Ethernet frame.

Specifically, the switch device 151 relays an Ethernet frame exchanged between the extra-vehicular communication device 101, the in-vehicle ECU 111, and the autonomous driving ECU 112, for example.

The in-vehicle ECU 111 is, for example, a camera, a laser sensor, and the like, detects other vehicles 2, pedestrians, structures, and the like around the target vehicle 1, and creates surrounding detection information indicating detection results.

The in-vehicle ECU 111, for example, stores the created surrounding detection information into an Ethernet frame, sets the destination media access control (MAC) address of the Ethernet frame as the MAC address of the autonomous driving ECU 112, and transmits the MAC address to the switch device 151.

When receiving the Ethernet frame from the in-vehicle ECU 111, the switch device 151 confirms the destination MAC address of the received Ethernet frame and transmits the Ethernet frame to the autonomous driving ECU 112.

The autonomous driving ECU 112 controls the driving of the own target vehicle 1. Specifically, the autonomous driving ECU 112 can control fully autonomous driving and partially autonomous driving for the own target vehicle 1.

Here, the fully autonomous driving control is, for example, control that does not require the driver to operate the target vehicle 1. The partially autonomous driving control is, for example, control for automating a part of the driver's operation on the target vehicle 1 such as brake assist and lane keeping.

More specifically, when the autonomous driving ECU 112 receives an Ethernet frame storing the surrounding detection information from the switch device 151, for example, the autonomous driving ECU 112 acquires the surrounding detection information from the received Ethernet frame.

Further, the autonomous driving ECU 112, for example, acquires the position of the own target vehicle 1 based on radio waves from global positioning system (GPS) satellites at each predetermined cycle and creates vehicle position information indicating the acquired position.

Moreover, the autonomous driving ECU 112, for example, acquires the map information and the control information from the map server 184 and the control server 185, respectively, via the external network 11, the radio base station device 161, the extra-vehicular communication device 101, and the switch device 151.

For example, when the target vehicle 1 is an unmanned vehicle, the autonomous driving ECU 112 controls the fully autonomous driving of the own target vehicle 1 based on the surrounding detection information, the vehicle position information, the map information, the control information, and the like.

Specifically, the autonomous driving ECU 112, for example, controls the fully autonomous driving for the own target vehicle 1 so as to travel on a road, a parking lot, or the like or stop on a designated road shoulder in accordance with an instruction from the control server 185.

In addition, for example, when the target vehicle 1 is a manned vehicle, the autonomous driving ECU 112 can control the fully autonomous driving for the own target vehicle 1 based on the surrounding detection information, the vehicle position information, the map information, and the like.

Further, the autonomous driving ECU 112, for example, controls the partially autonomous driving based on the surrounding detection information.

[Basic Example of Communication Control in Emergency]

Figure 2:
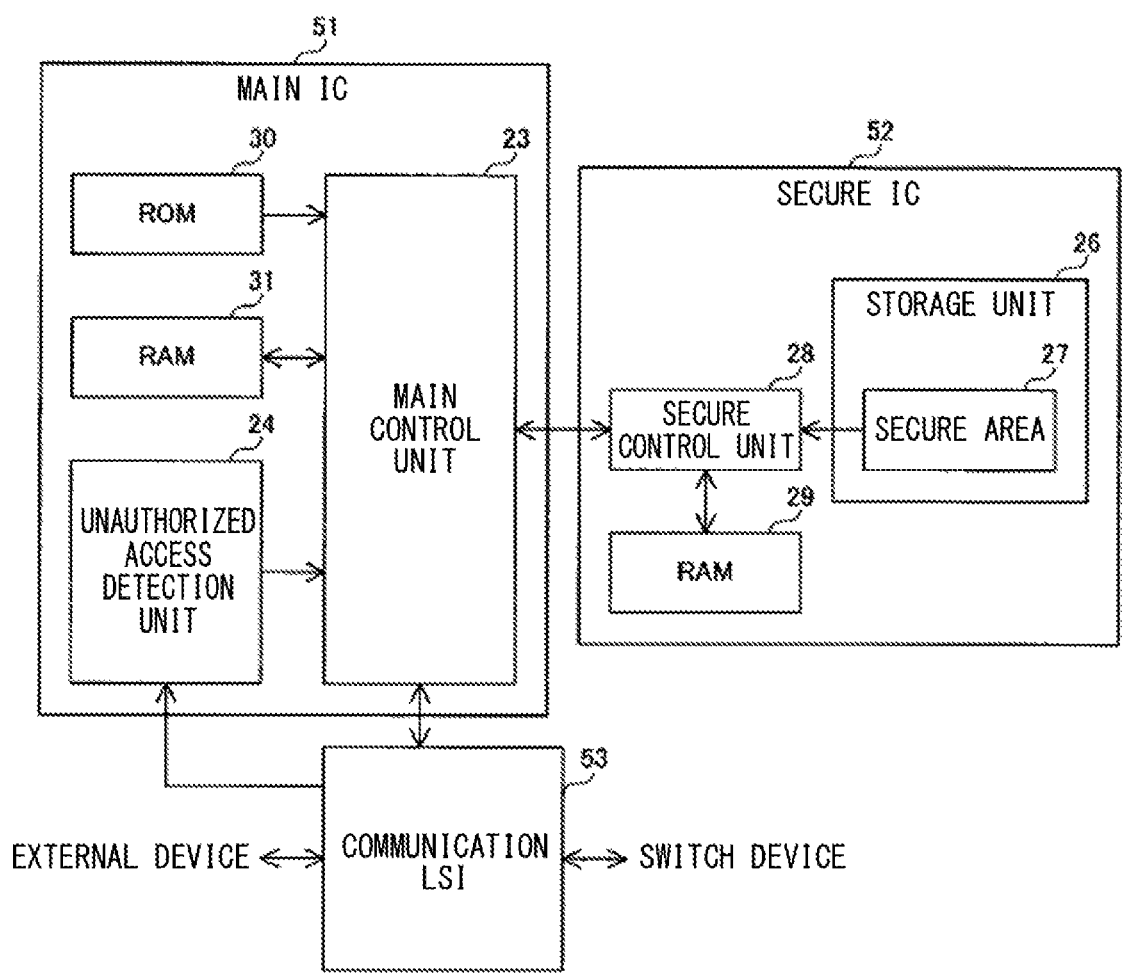
FIG. 2 is a diagram showing a configuration of an extra-vehicular communication device in the in-vehicle communication system according to the first embodiment of the present invention.

FIG. 2 is a diagram showing the configuration of the extra-vehicular communication device in the in-vehicle communication system according to the first embodiment of the present invention.

Referring to FIG. 2, the extra-vehicular communication device 101 includes a main integrated circuit (IC) 51, a secure IC 52, and a communication large-scale integration (LSI) 53.

The main IC 51 includes a main control unit 23, an unauthorized access detection unit 24, a read only memory (ROM) 30, and a random access memory (RAM) 31.

The secure IC 52 includes a storage unit 26, a secure control unit 28, and a RAM 29. The storage unit 26 includes a secure area 27.

The RAM 31 in the main IC 51 is used as a work area for the main control unit 23, a temporary storage area for programs, and the like.

The ROM 30 is, for example, a flash-ROM (FROM) and stores normal-time operation information regarding a predetermined operation in a normal time.

More specifically, the normal-time operation information includes a main program for performing a predetermined operation in a normal time when unauthorized access is not received. Specifically, the normal-time operation information includes, for example, a main external communication program and a main internal communication program as main programs.

The main external communication program is a program for causing the communication LSI 53 to transmit and receive information to and from the external device.

The main internal communication program is a program for causing the communication LSI 53 to transmit and receive information to and from the in-vehicle equipment.

The secure IC 52 is an example of a secure device and is specifically a subscriber identity module (SIM) card. It is difficult to illegally operate the secure control unit 28 in the secure IC 52 from the outside and to illegally rewrite the information stored in the secure area 27 from the outside.

The RAM 29 in the secure IC 52 is used as a work area for the secure control unit 28, a temporary storage area for programs, and the like.

The storage unit 26 stores emergency operation information regarding a predetermined operation in an emergency in the secure area 27.

Further, the storage unit 26 stores contractor information including a communication speed and subscriber authentication information in the secure area 27, for example.

More specifically, the emergency operation information specifically includes, for example, an emergency program for performing a predetermined operation in an emergency. In this example, the emergency operation information includes an emergency external communication program and an emergency internal communication program as emergency programs.

The emergency external communication program is a program for communicating with the external device. More specifically, the emergency external communication program is a program for causing the communication LSI 53 to transmit and receive information to and from the external device at a minimum.

The emergency internal communication program is a program for communicating with the in-vehicle equipment. More specifically, the emergency internal communication program is a program for causing the communication LSI 53 to transmit and receive information to and from the in-vehicle equipment at a minimum.

Access to the secure area 27 from the main control unit 23 is permitted when the main control unit 23 outputs predetermined information.

In this example, the secure area 27 is accessible from the main control unit 23 when the main control unit 23 follows a predetermined procedure P1, and is not accessible when the main control unit 23 does not follow the procedure P1.

More specifically, the secure control unit 28 can access the secure area 27. On the other hand, the main control unit 23 can access the secure area 27 only when authenticated by the secure control unit 28 in the secure IC 52.

When trying to access the secure area 27, the main control unit 23 outputs an access request to the secure control unit 28, for example.

When receiving an access request from the main control unit 23, the secure control unit 28 outputs to the main control unit 23 an authentication information request indicating a request for authentication information.

When receiving the authentication information request from the secure control unit 28, the main control unit 23 outputs authentication information including, for example, a password or a combination of a password and an ID to the secure control unit 28 in accordance with the received authentication information request.

When receiving the authentication information from the main control unit 23, the secure control unit 28 authenticates the received authentication information. When the authentication of the authentication information is successful, the secure control unit 28 outputs permission information indicating access permission to the main control unit 23. On the other hand, when the authentication of the authentication information fails, the secure control unit 28 outputs non-permission information indicating access non-permission to the main control unit 23.

When receiving permission information from the secure control unit 28, the main control unit 23 can access the secure area 27 via the secure control unit 28, but when receiving non-permission information from the secure control unit 28, the main control unit 23, in accessing the secure area 27, is blocked by the secure control unit 28.

The authentication of the main control unit 23 by the secure control unit 28 is not limited to the configuration in accordance with the procedure P1 described above, but may be configured such that, for example, the main control unit 23 transmits authentication information to the secure control unit 28, and the secure control unit 28 authenticates the authentication information received from the main control unit 23.

Figure 3:
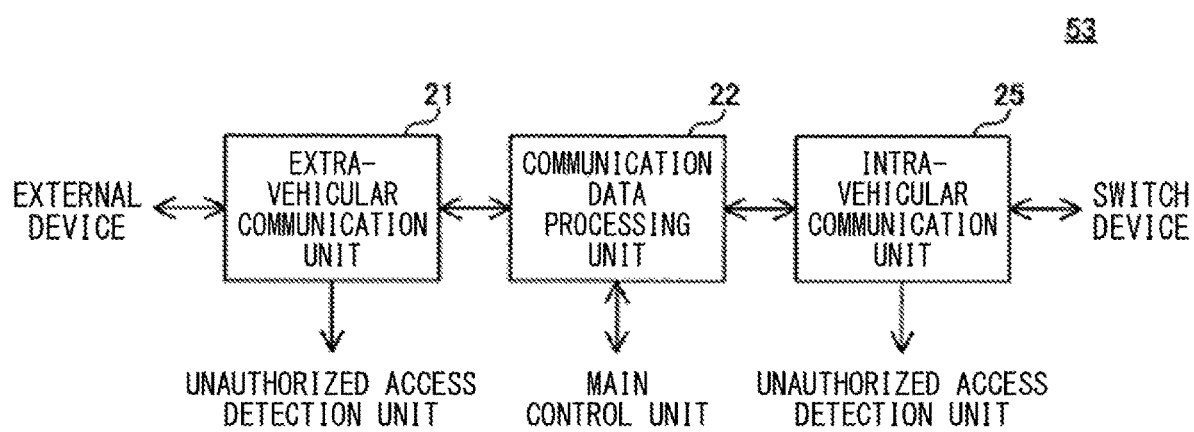
FIG. 3 is a diagram showing a configuration of a communication large-scale integration (LSI) in the extra-vehicular communication device according to the first embodiment of the present invention.

FIG. 3 is a diagram showing the configuration of the communication LSI in the extra-vehicular communication device according to the first embodiment of the present invention.

Referring to FIG. 3, the communication LSI 53 includes an extra-vehicular communication unit 21, a communication data processing unit 22, and an intra-vehicular communication unit 25.

The communication data processing unit 22 in the communication LSI 53 operates in accordance with the control of the main control unit 23.

The extra-vehicular communication unit 21 can communicate with the external device. Specifically, the extra-vehicular communication unit 21 can communicate with the IP server via the radio base station device 161 in accordance with the IP protocol, for example.

More specifically, the extra-vehicular communication unit 21 can perform wireless communication with the radio base station device 161 in conformity with a communication standard such as long-term evolution (LTE) or 3G, for example.

Specifically, for example, when receiving a wireless frame storing an IP packet from an IP server from the radio base station device 161, the extra-vehicular communication unit 21 acquires the IP packet from the received wireless frame and outputs the acquired IP packet to the communication data processing unit 22.

Further, when receiving the IP packet with its destination being the IP server from the communication data processing unit 22, the extra-vehicular communication unit 21 stores the received IP packet into a wireless frame and transmits the wireless frame to the radio base station device 161.

Referring to FIG. 1 again, when receiving a wireless frame from the extra-vehicular communication device 101, the radio base station device 161 acquires an IP packet from the received wireless frame and transmits the acquired IP packet to the destination IP server via the external network 11.

Further, when receiving the IP packet from the IP server via the external network 11, the radio base station device 161 stores the received IP packet into a wireless frame and transmits the wireless frame to the extra-vehicular communication device 101.

Referring to FIG. 2 again, the extra-vehicular communication unit 21 can perform vehicle-to-vehicle communication with the in-vehicle communication device 187 in another vehicle 2, for example.

The intra-vehicular communication unit 25 can communicate with the switch device 151. Specifically, the intra-vehicular communication unit 25 can communicate with the switch device 151 in conformity with an Ethernet communication standard, for example.

More specifically, when receiving an Ethernet frame from the switch device 151, the intra-vehicular communication unit 25 acquires an IP packet from the received Ethernet frame and outputs the acquired IP packet to the communication data processing unit 22.

Further, when receiving the IP packet from the communication data processing unit 22, the intra-vehicular communication unit 25 stores the received IP packet into an Ethernet frame and transmits the Ethernet frame to the switch device 151.

[Flow of Operation]

Each device in the in-vehicle communication system 301 includes a computer, and an arithmetic processing unit such as a central processing unit (CPU) in the computer reads and executes a program including some or all of the steps in the following sequence diagram or flowchart from a memory (not shown). The programs of the plurality of apparatuses can each be installed from the outside. The programs of the plurality of apparatuses are each distributed in the state of being stored in a recording medium.

Figure 4:
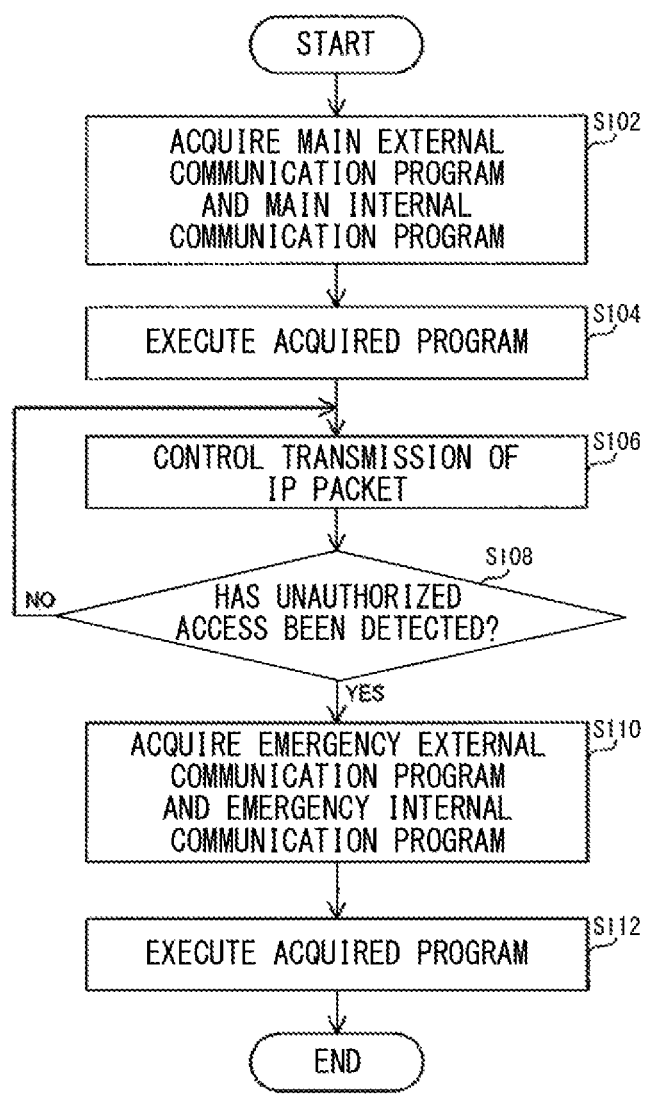
FIG. 4 is a flowchart defining an operation procedure of each processing that is performed when the extra-vehicular communication device according to the first embodiment of the present invention detects unauthorized access.

FIG. 4 is a flowchart defining the operation procedure of each processing that is performed when the extra-vehicular communication device according to the first embodiment of the present invention detects unauthorized access.

Referring to FIG. 4, for example, a situation is assumed where the power supply of the extra-vehicular communication device 101 is turned on.

First, the extra-vehicular communication device 101 acquires a main external communication program and a main internal communication program from the ROM 30 (step S102).

More specifically, for example, when the power supply of the own extra-vehicular communication device 101 is turned on, the main control unit 23 acquires the main external communication program and the main internal communication program from the ROM 30.

Next, the extra-vehicular communication device 101 executes the acquired main external communication program and main internal communication program (step S104).

More specifically, the main control unit 23 performs processing based on normal-time operation information. Specifically, the main control unit 23 initializes the communication data processing unit 22 in the communication LSI 53 in accordance with the main internal communication program and the main external communication program.

This makes it possible to transmit and receive data between the communication data processing unit 22, the radio base station device 161, and the switch device 151.

Then, the main control unit 23 establishes a communication connection with the carrier server 183 in accordance with the main external communication program, for example.

More specifically, the main control unit 23 causes the secure control unit 28 to authenticate itself by exchanging information with the secure control unit 28 in accordance with the procedure P1, and acquires the contractor information from the secure area 27 via the secure control unit 28.

The main control unit 23 transmits contractor information to the carrier server 183 via the communication LSI 53, the radio base station device 161, and the external network 11 in order to receive authentication from the carrier server 183.

The main control unit 23 receives authentication from the carrier server 183 by exchanging predetermined information with the carrier server 183 via the communication LSI 53, and establishes a communication connection with the carrier server 183.

This brings the communication data processing unit 22 into the state of being able to perform transmission control of IP packets transmitted and received between the external device and the in-vehicle equipment.

Next, the extra-vehicular communication device 101 transmits the IP packet received from the external device to the switch device 151 and performs IP packet transmission processing for transmitting the IP packet received from the switch device 151 to the external device (step S106).

More specifically, for example, when the communication data processing unit 22 in the communication LSI 53 receives an IP packet including a request for control information, map information, text information, image information, moving image information, and audio information from the intra-vehicular communication unit 25, the communication data processing unit 22 outputs the received IP packet to the destination IP server via the extra-vehicular communication unit 21, the radio base station device 161, and the external network 11.

Further, for example, when the communication data processing unit 22 receives from the IP server an IP packet including control information, map information, text information, image information, moving image information, and audio information via the external network 11, the radio base station device 161, and the extra-vehicular communication unit 21, the communication data processing unit 22 outputs the received IP packet to the in-vehicle equipment having transmitted the request via the intra-vehicular communication unit 25 and the switch device 151.

In this case, the communication path of the IP packet transmitted and received by the communication data processing unit 22 is not limited.

Next, the extra-vehicular communication device 101 attempts to detect unauthorized access in the in-vehicle equipment (step S108).

More specifically, the unauthorized access detection unit 24 detects unauthorized access in the in-vehicle equipment installed in the target vehicle 1. Specifically, the unauthorized access detection unit 24 detects unauthorized access in its own extra-vehicular communication device 101, switch device 151, in-vehicle ECU 111, autonomous driving ECU 112, and the like.

The unauthorized access detection unit 24 detects, for example, an attack on the in-vehicle equipment, unauthorized control of the in-vehicle equipment, rewriting of firmware used by the in-vehicle equipment, and the like.

Further, when one piece of the in-vehicle equipment is replaced with an unauthorized piece, an unauthorized message transmitted in the in-vehicle network 10 is detected.

Specifically, the unauthorized access detection unit 24 monitors, for example, information transmitted and received by the extra-vehicular communication unit 21 in the communication LSI 53 and detects unauthorized access from the outside of the target vehicle 1 based on the monitoring result. Further the unauthorized access detection unit 24 monitors, for example, information transmitted and received by the intra-vehicular communication unit 25 in the communication LSI 53 and detects unauthorized access from the inside of the target vehicle 1 based on the monitoring result.

More specifically, for example, when detecting an abnormal IP address, an abnormal frame configuration, an abnormal IP packet content, or the like, the unauthorized access detection unit 24 determines that there has been unauthorized access in the in-vehicle equipment.

Further, the unauthorized access detection unit 24 acquires the unauthorized access detection result from, for example, the in-vehicle equipment capable of detecting unauthorized access such as the switch device 151.

More specifically, for example, the switch device 151 monitors information relayed by itself and detects unauthorized access in the in-vehicle equipment based on the monitoring result. For example, when detecting unauthorized access, the switch device 151 transmits detection information indicating that unauthorized access has been detected to the extra-vehicular communication device 101.

When receiving the detection information from the switch device 151 via the intra-vehicular communication unit 25, the unauthorized access detection unit 24 determines that there has been unauthorized access in the in-vehicle equipment.

When the extra-vehicular communication device 101 has not detected unauthorized access in the in-vehicle equipment (NO in step S108), the extra-vehicular communication device 101 continues the IP packet transmission processing (step S106).

On the other hand, when detecting unauthorized access in the in-vehicle equipment (YES in step S108), the extra-vehicular communication device 101 acquires the emergency operation information, specifically the emergency external communication program and the emergency internal communication program, from the secure area 27 in the storage unit 26 (step S110).

More specifically, when determining that there has been unauthorized access in the in-vehicle equipment, the unauthorized access detection unit 24 outputs determination information indicating the determination content to the main control unit 23.

When unauthorized access in the in-vehicle equipment is detected, the main control unit 23 performs processing based on the emergency operation information.

Specifically, when receiving the determination information from the unauthorized access detection unit 24, the main control unit 23 causes the secure control unit 28 to authenticate itself by exchanging information with the secure control unit 28 in accordance with the procedure P1, and acquires the emergency external communication program and the emergency internal communication program from the secure area 27 via the secure control unit 28.

Next, the extra-vehicular communication device 101 executes the acquired emergency external communication program and emergency internal communication program (step S112).

More specifically, the main control unit 23 causes the communication LSI 53 to perform transmission/reception of information with the external device and transmission/reception of information with the in-vehicle equipment at a minimum in accordance with the acquired emergency external communication program and emergency internal communication program.

In this case, the communication path of the IP packet transmitted and received by the communication data processing unit 22 is not limited.

With such a configuration, even when unauthorized access is received, the extra-vehicular communication device 101 can safely communicate with an unspecified external device by use of a safe program stored in the secure area 27.

In step S110 above, the main control unit 23 in the extra-vehicular communication device 101 has been configured to acquire the emergency external communication program and the emergency internal communication program from the secure area 27 in the storage unit 26. However, the present invention is not limited thereto. For example, when the emergency program stored in the secure area 27 is one of the emergency external communication program and the emergency internal communication program, the main control unit 23 may be configured to acquire one of the stored emergency external communication program and emergency internal communication program In this case, the main control unit 23 causes the communication LSI 53 to perform one of transmission/reception of information with the external device and transmission/reception of information with the in-vehicle equipment at a minimum.

[First Modification of Communication Control in Emergency]

The extra-vehicular communication device 101 is not limited to the configuration to communicate with an unspecified external device at the time of occurrence of unauthorized access, but may be configured to limit the communication destination to a specific external device.

Referring to FIG. 2 again, in this example, the secure area 27 in the storage unit 26 stores emergency operation information and emergency communication destination information regarding an emergency communication destination outside the target vehicle 1.

Specifically, the emergency communication destination is, for example, the external device (hereinafter also referred to as a driving-related external device) that transmits information necessary for the autonomous driving of the target vehicle 1.

More specifically, the emergency communication destination information includes, for example, the IP address of the map server 184 and the IP address of the control server 185 as the addresses of the driving-related external devices.

In this example, the emergency operation information includes an emergency transmission restriction program as an emergency program. The emergency transmission restriction program is a program for causing the communication LSI 53 to restrict information to be relayed.

Further, the main control unit 23 sets one of a continuous mode and a non-continuous mode, for example. Whether to set the continuous mode or the non-continuous mode is selected by the user, for example.

In the continuous mode, when the unauthorized access is detected in a state where the autonomous driving is performed, the autonomous driving is continuously performed. On the other hand, in the non-continuous mode, when the unauthorized access is detected in the state where the autonomous driving is performed, the autonomous driving is switched to the manual driving.

[Flow of Operation]

Figure 5:
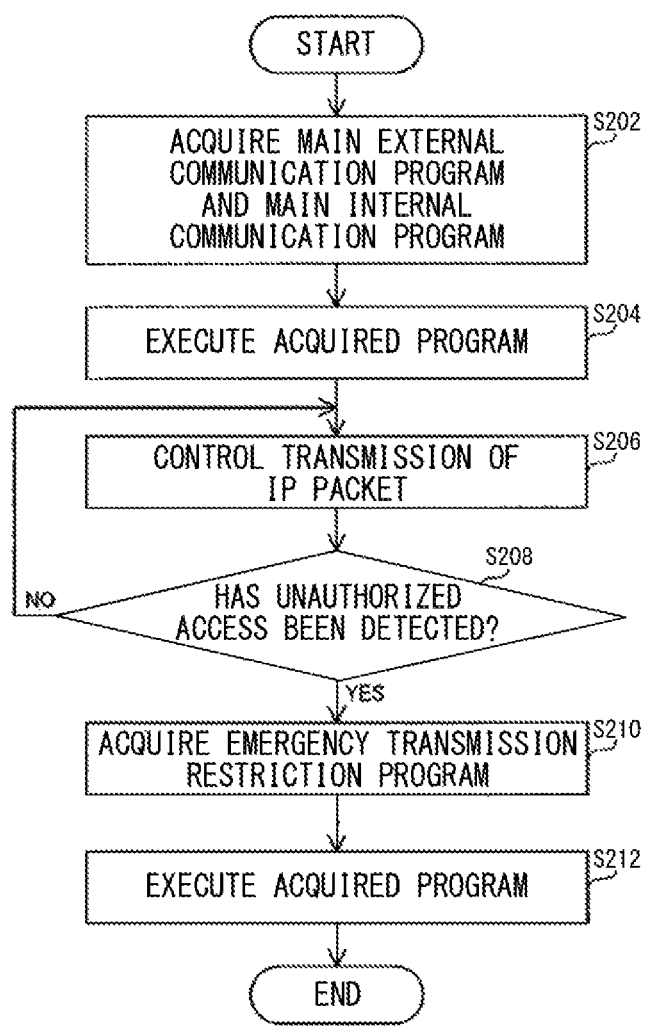
FIG. 5 is a flowchart defining an operation procedure of each processing that is performed when the extra-vehicular communication device according to the first embodiment of the present invention detects unauthorized access.

FIG. 5 is a flowchart defining an operation procedure of each processing that is performed when the extra-vehicular communication device according to the first embodiment of the present invention detects unauthorized access.

Referring to FIG. 5, for example, a situation is assumed where the power supply of the extra-vehicular communication device 101 is turned on, the main control unit 23 sets the continuous mode, and the autonomous driving is being performed in the target vehicle 1.

The operations in steps S202 to S208 are the same as the operations in steps S102 to S108 shown in FIG. 4.

Next, when detecting unauthorized access in the in-vehicle equipment (YES in step S208), the extra-vehicular communication device 101 acquires emergency operation information, specifically the emergency transmission restriction program, from the secure area 27 in the storage unit 26 (step S210).

Specifically, when unauthorized access in the in-vehicle equipment is detected, the main control unit 23 performs communication with the communication destination by use of the emergency communication destination information and processing based on the emergency operation information.

More specifically, when receiving the determination information from the unauthorized access detection unit 24, the main control unit 23 causes the secure control unit 28 to authenticate itself by exchanging information with the secure control unit 28 in accordance with the procedure P1, and acquires the emergency transmission restriction program from the secure area 27 via the secure control unit 28.

Next, the extra-vehicular communication device 101 executes the acquired emergency transmission restriction program (step S212).

More specifically, the main control unit 23 operates in accordance with the acquired emergency transmission restriction program and acquires the emergency communication destination information from the secure area 27 via the secure control unit 28.

Then, the main control unit 23 restricts the IP packet relayed by the communication LSI 53 to an IP packet with its destination being the communication destination indicated by the emergency communication destination information, and an IP packet with its destination being the destination indicated by the emergency communication destination information.

Specifically, the main control unit 23 registers the IP address of the map server 184 and the IP address of the control server 185 into the communication data processing unit 22 in the communication LSI 53.

The communication data processing unit 22, for example, uses the registered IP address of the map server 184 and the registered IP address of the control server 185 to discard IP packets except for those transmitted and received to and from the map server 184 and the control server 185.

More specifically, when receiving an IP packet from the extra-vehicular communication unit 21, the communication data processing unit 22 confirms whether or not the source IP address of the received IP packet matches the IP address of the map server 184 or the IP address of the control server 185.

When confirming that the IP packet matches one of the IP addresses, the communication data processing unit 22 outputs the IP packet to the intra-vehicular communication unit 25 On the other hand, when confirming that the IP address matches neither of the IP addresses, the communication data processing unit 22 discards the IP packet.

Further, when receiving the IP packet from the intra-vehicular communication unit 25, the communication data processing unit 22 confirms whether or not the destination IP address of the received IP packet matches the IP address of the map server 184 or the IP address of the control server 185.

When confirming that the IP packet matches one of the IP addresses, the communication data processing unit 22 outputs the IP packet to the extra-vehicular communication unit 21 On the other hand, when confirming that the IP address matches neither of the IP addresses, the communication data processing unit 22 discards the IP packet.

With such a configuration, when unauthorized access occurs among control information, map information, text information, image information, moving image information, audio information, and the like that are transmitted in a normal time, it is possible to restrict transmission of information except for the control information and the map information that are necessary for the autonomous driving of the target vehicle 1, so that the autonomous driving can be continued satisfactorily.

Note that the main control unit 23 may restrict transmission of information except for information necessary for the autonomous driving of the target vehicle 1 and may perform the following processing when unauthorized access in the in-vehicle equipment is detected. That is, the main control unit 23 may be configured to establish a communication connection with the driving-related external device by use of, for example, a virtual private Network (VPN) or an IP-VPN described in Non-Patent Literature 1 ("Wikipedia", [online], [Search on Jan. 16, 2017], Internet <URL:http://ja.wikipedia.org/wiki/Virtual_Private_Network>).

With such a configuration, since the extra-vehicular communication device 101 and the driving-related external device are connected by communication through a single virtual dedicated line, the opportunity for an unauthorized external device to access the in-vehicle network 10 can be reduced, to prevent an adverse effect of unauthorized access in the in-vehicle network 10.

[Second Modification of Communication Control in Emergency]

The extra-vehicular communication device 101 is not limited to the configuration to communicate with an unspecified external device when unauthorized access occurs, but may be configured to notify a predetermined communication destination that unauthorized access has been received.

Referring to FIG. 2 again, in this example, the storage unit 26 stores emergency communication destination information, emergency operation information, and contractor information in secure area 27.

The emergency communication destination is, for example, the external device of the emergency-report receiving organization (hereinafter also referred to as a report destination external device).

More specifically, the emergency communication destination information includes, for example, the IP address of the report destination server 182 as the address of the report destination external device.

The emergency operation information includes an emergency report program as an emergency program. The emergency report program is a program for causing the communication LSI 53 to notify the emergency-report receiving organization that unauthorized access has been received.

[Flow of Operation]

Figure 6:
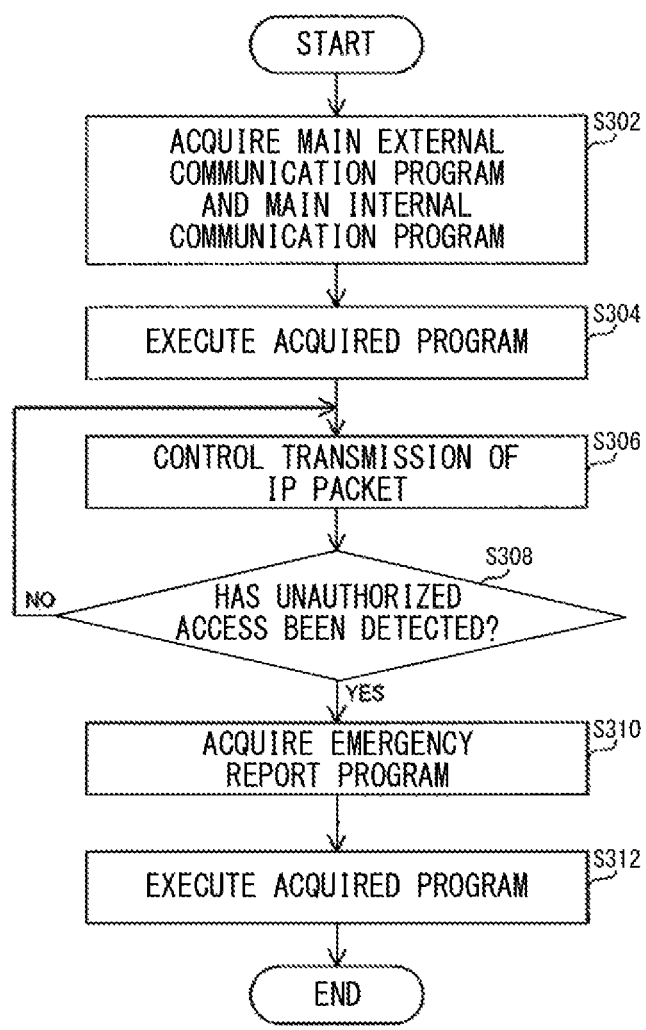
FIG. 6 is a flowchart defining an operation procedure of each processing that is performed when the extra-vehicular communication device according to the first embodiment of the present invention detects unauthorized access.

FIG. 6 is a flowchart defining an operation procedure of each processing that is performed when the extra-vehicular communication device according to the first embodiment of the present invention detects unauthorized access.

Referring to FIG. 6, for example, a situation is assumed where the power supply of the extra-vehicular communication device 101 is turned on.

The operations in steps S302 to S308 are the same as the operations in steps S102 to S108 shown in FIG. 4.

Next, when detecting unauthorized access in the in-vehicle equipment (YES in step S308), the extra-vehicular communication device 101 acquires emergency operation information, specifically the emergency report program, from the secure area 27 in the storage unit 26 (step S310).

More specifically, when receiving the determination information from the unauthorized access detection unit 24, the main control unit 23 causes the secure control unit 28 to authenticate itself by exchanging information with the secure control unit 28 in accordance with the procedure P1, and acquires the emergency report program from the secure area 27 via the secure control unit 28.

Next, the extra-vehicular communication device 101 executes the acquired emergency report program (step S312).

More specifically, the main control unit 23 operates in accordance with the acquired emergency report program and acquires the emergency communication destination information from the secure area 27 via the secure control unit 28.

Then, the main control unit 23 notifies the emergency-report receiving organization that unauthorized access has occurred in the target vehicle 1 by use of, for example, the IP address of the report destination server 182 included in the emergency communication destination information.

More specifically, for example, the main control unit 23 creates emergency-notification information indicating that unauthorized access has occurred in the target vehicle 1 and creates an IP packet including the created emergency-notification information in a payload.

The main control unit 23 sets the destination IP address of the created IP packet as the IP address of the report destination server 182 and causes the communication LSI 53 to transmit the IP packet to the report destination server 182.

[Third Modification of Communication Control in Emergency]

The extra-vehicular communication device 101 is not limited to the configuration to communicate with an unspecified external device at the time of occurrence of unauthorized access, but may be configured to broadcast the occurrence of unauthorized access.

Referring to FIG. 2 again, in this example, the storage unit 26 stores emergency communication destination information, emergency operation information, and contractor information in secure area 27.

The emergency communication destination indicates a broadcast, for example. More specifically, the emergency communication destination information indicates, for example, a broadcast address as a communication destination that indicates a broadcast.

The emergency operation information includes an emergency surrounding broadcast program as an emergency program. The emergency surrounding broadcast program is a program for broadcasting to surrounding vehicles that the communication LSI 53 has received unauthorized access.

[Flow of Operation]

Figure 7:
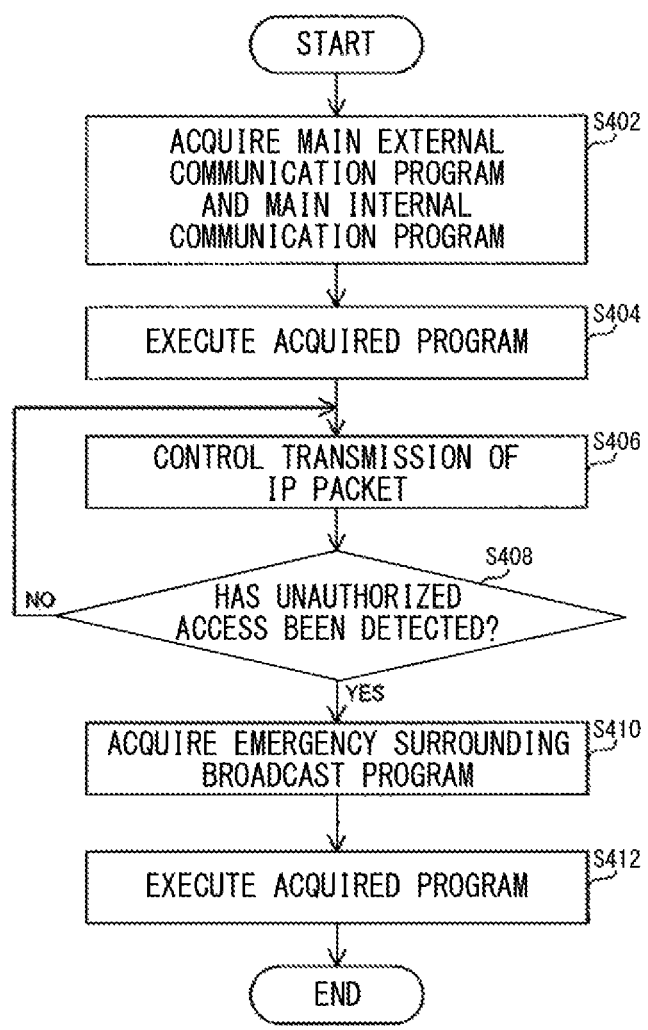
FIG. 7 is a flowchart defining an operation procedure of each processing that is performed when the extra-vehicular communication device according to the first embodiment of the present invention detects unauthorized access.

FIG. 7 is a flowchart defining an operation procedure of each processing that is performed when the extra-vehicular communication device according to the first embodiment of the present invention detects unauthorized access.

Referring to FIG. 7, for example, a situation is assumed where the power supply of the extra-vehicular communication device 101 is turned on.

The operations in steps S402 to S408 are the same as the operations in steps S102 to S108 shown in FIG. 4.

Next, when detecting unauthorized access in the in-vehicle equipment (YES in step S408), the extra-vehicular communication device 101 acquires emergency operation information, specifically the emergency surrounding broadcast program, from the secure area 27 in the storage unit 26 (step S410).

More specifically, when receiving the determination information from the unauthorized access detection unit 24, the main control unit 23 causes the secure control unit 28 to authenticate itself by exchanging information with the secure control unit 28 in accordance with the procedure P1, and acquires the emergency surrounding broadcast program from the secure area 27 via the secure control unit 28.

Next, the extra-vehicular communication device 101 executes the acquired emergency surrounding broadcast program (step S412).

More specifically, the main control unit 23 operates in accordance with the acquired emergency surrounding broadcast program and acquires the emergency communication destination information from the secure area 27 via the secure control unit 28.

Then, the main control unit 23 broadcasts information that the target vehicle 1 has received unauthorized access as a communication with the communication destination by use of the emergency communication destination information by use of the broadcast address indicated by the emergency communication destination information.

More specifically, for example, the main control unit 23 creates surrounding notification information indicating that unauthorized access has occurred in the target vehicle 1 and creates an IP packet including the created surrounding notification information in the payload.

The main control unit 23 sets the destination IP address of the created IP packet as the broadcast address and causes the communication LSI 53 to broadcast the IP packet.

More specifically, the extra-vehicular communication unit 21 in the communication LSI 53 confirms that the destination IP address of the IP packet from the main control unit 23 is a broadcast address in accordance with the control of the main control unit 23. Then, the extra-vehicular communication unit 21 stores the IP packet into a wireless frame and broadcasts the wireless frame.

Referring to FIG. 1 again, when the in-vehicle communication device 187 in another vehicle 2 receives the surrounding notification information from the target vehicle 1 while another vehicle 2 is being driven autonomously, for example, the in-vehicle communication device 187 performs driving control for avoiding a collision with the target vehicle 1 based on the received surrounding notification information.

Further, for example, when the in-vehicle communication device 187 receives the surrounding notification information from the target vehicle 1 while another vehicle 2 is being driven manually by a driver, for example, the in-vehicle communication device 187 notifies the driver of contents of the received surrounding notification information.

[Control of Autonomous Driving in Emergency]

The extra-vehicular communication device 101 is not limited to the configuration to communicate with an unspecified external device at the time of occurrence of unauthorized access, but may be configured to control the autonomous driving of the own target vehicle 1.

Referring to FIG. 2 again, in this example, the storage unit 26 stores the emergency operation information, and the contractor information into secure area 27.

The emergency operation information includes an emergency driving instruction program and an emergency driving switching program as emergency programs.

The emergency driving instruction program is a program for giving an instruction for safely stopping the target vehicle 1 by the autonomous driving to the autonomous driving ECU 112 in the continuous mode described above. The emergency driving switching program is a program for switching the driving of the target vehicle 1 from the autonomous driving to the manual driving in the non-continuous mode described above.

[Flow of Operation]

Figure 8:
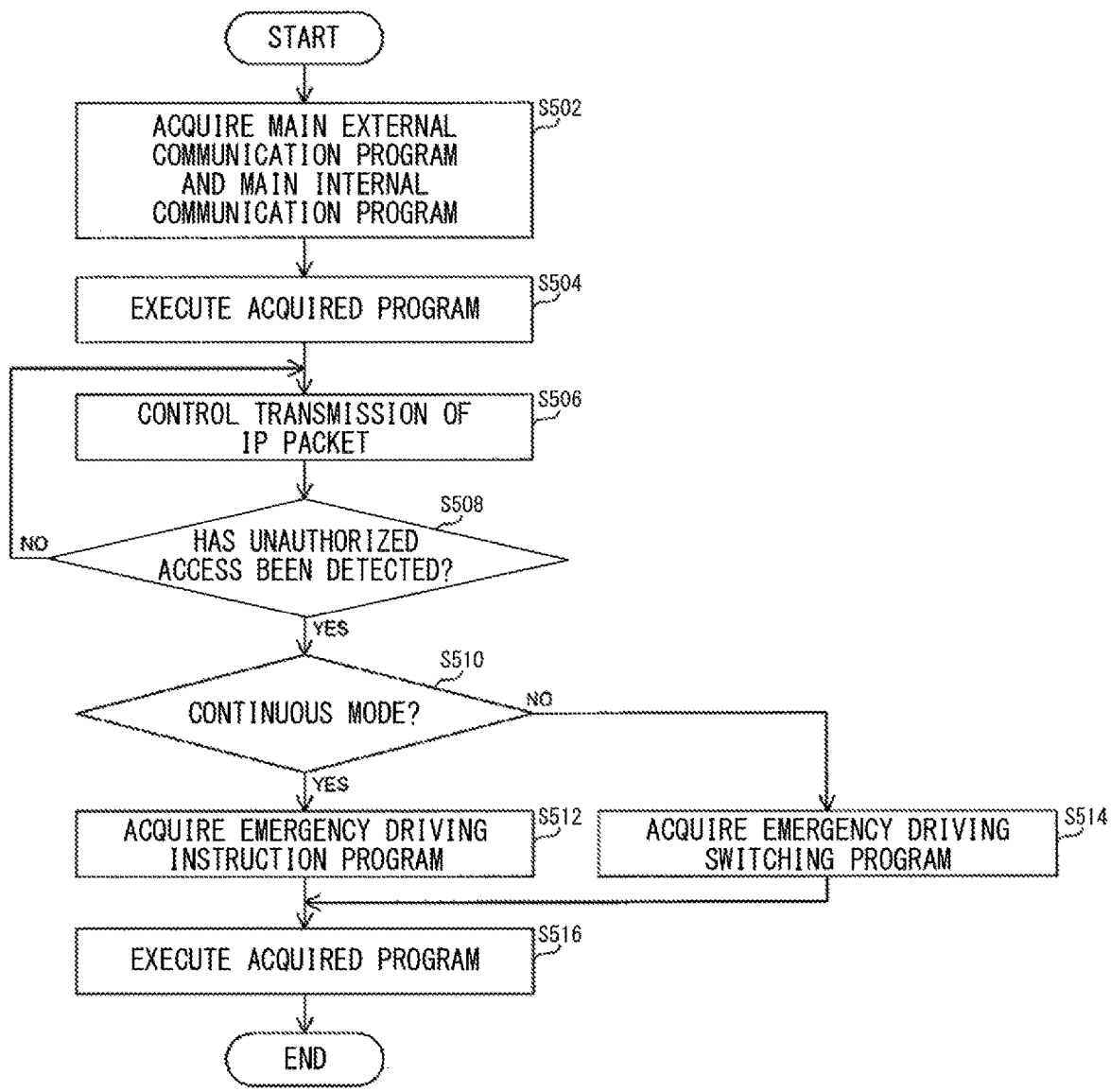
FIG. 8 is a flowchart defining an operation procedure of each processing that is performed when the extra-vehicular communication device according to the first embodiment of the present invention detects unauthorized access.

FIG. 8 is a flowchart defining an operation procedure of each processing that is performed when the extra-vehicular communication device according to the first embodiment of the present invention detects unauthorized access.

Referring to FIG. 8, for example, a situation is assumed where the power supply of the extra-vehicular communication device 101 is turned on.

The operations in steps S502 to S508 are the same as the operations in steps S102 to S108 shown in FIG. 4.

Next, when the continuous mode has been set (YES in step S510), the extra-vehicular communication device 101 acquires emergency operation information, specifically the emergency driving instruction program, from the secure area 27 in the storage unit 26 (step S512).

More specifically, when the continuous mode has been set, upon reception of the determination information from the unauthorized access detection unit 24, the main control unit 23 causes the secure control unit 28 to authenticate itself by exchanging information with the secure control unit 28 in accordance with the procedure P1, and acquires the emergency driving instruction program from the secure area 27 via the secure control unit 28.

On the other hand, when the non-continuous mode has been set (NO in step S510), the extra-vehicular communication device 101 acquires emergency operation information, specifically the emergency driving switching program, from the secure area 27 in the storage unit 26 (step S514).

More specifically, when the non-continuous mode has been set, upon reception of the determination information from the unauthorized access detection unit 24, the main control unit 23 causes the secure control unit 28 to authenticate itself by exchanging information with the secure control unit 28 in accordance with the procedure P1, and acquires the emergency driving switching program from the secure area 27 via the secure control unit 28.

Next, the extra-vehicular communication device 101 executes the acquired emergency driving instruction program or emergency driving switching program (step S516).

Specifically, when acquiring the emergency driving instruction program from the secure area 27, the main control unit 23 operates in accordance with the emergency operation instruction program, performs control for safely stopping the own target vehicle 1 on the autonomous driving ECU 112, and notifies the driver of the control.

More specifically, the main control unit 23 creates an IP packet that includes in the payload a road shoulder stop command that indicates stopping of the target vehicle 1 on the road shoulder.

The main control unit 23 sets the destination IP address of the created IP packet as the IP address of the autonomous driving ECU 112 and causes the communication LSI 53 to transmit the IP packet to the autonomous driving ECU 112.

The autonomous driving ECU 112 receives a road shoulder stop command from the extra-vehicular communication device 101 via the switch device 151 and stops the own target vehicle 1 on the road shoulder by the autonomous driving in accordance with the received road shoulder stop command (cf. FIG. 1).

Further, the main control unit 23 creates status information indicating the stopping of the target vehicle 1 on the road shoulder due to occurrence of unauthorized access and creates an IP packet including the created status information in the payload.

The main control unit 23 sets the destination IP address of the created IP packet as an IP address of an instrument display controller that is an example of the in-vehicle ECU 111, and causes the communication LSI 53 to transmit the IP packet to the instrument display controller.

The instrument display controller receives the status information from the extra-vehicular communication device 101 via the switch device 151 and displays the received control status information on an instrument to notify the driver of the content of the status information (cf. FIG. 1).

In addition, when the emergency driving switching program is acquired from the secure area 27, the main control unit 23 operates in accordance with the emergency driving switching program, switches the driving control of the target vehicle 1 from the fully autonomous driving or the partially autonomous driving to manual driving, and notifies the driver of the switching.

More specifically, the main control unit 23 creates an IP packet that includes a manual driving switching command in the payload.

The main control unit 23 sets the destination IP address of the created IP packet as the IP address of the autonomous driving ECU 112 and causes the communication LSI 53 to transmit the IP packet to the autonomous driving ECU 112.

The autonomous driving ECU 112 receives the manual driving switching command from the extra-vehicular communication device 101 via the switch device 151 and switches the driving control of the own target vehicle 1 from the fully autonomous driving or the partially autonomous driving to the manual driving in accordance with the received manual driving switching command (cf. FIG. 1).

Further, the main control unit 23 creates status information indicating the switching from the autonomous driving to the manual driving due to occurrence of unauthorized access and creates an IP packet including the created status information in the payload.

The main control unit 23 sets the destination IP address of the created IP packet as the IP address of the instrument display controller and causes the communication LSI 53 to transmit the IP packet to the instrument display controller.

In the extra-vehicular communication device according to the first embodiment of the present invention, the storage unit 26 has been configured to store the emergency operation information in the secure area 27, or store the emergency communication destination information and the emergency operation information in the secure area 27. However, the present invention is not limited thereto. The storage unit 26 may be configured to store the emergency communication destination information in the secure area 27. In this case, for example, the main control unit 23 operates in accordance with the main program in the ROM 30, acquires the emergency communication destination information from the secure area 27, and uses the acquired information.

Further, in the extra-vehicular communication device according to the first embodiment of the present invention, the main control unit 23 has been configured to perform processing based on the emergency operation information, or perform communication with the communication destination by use of the emergency communication destination information and processing based on the emergency operation information, when unauthorized access in the in-vehicle equipment is detected. However, the present invention is not limited thereto. The main control unit 23 may be configured to perform communication with the communication destination by use of the emergency communication destination information when the unauthorized access is detected. In this case, for example, the main control unit 23 acquires the emergency communication destination information from the secure area 27 in accordance with the main program in the ROM 30 and communicates with the communication destination of the acquired emergency communication destination information.

Further, the extra-vehicular communication device according to the first embodiment of the present invention has been configured to perform restriction of transmission of the IP packet, transmission of information to the communication destination by use of the IP packet, and the like. However, the present invention is not limited thereto. It may be a configured to perform, for example, restriction of the transmission of an Ethernet frame, a wireless frame, and a message in conformity with the communication standard of a controller area network (CAN), except for the IP packet, transmission of information to communication destinations by use of the Ethernet frame, the wireless frame, and the message, and the like.

Further, in the extra-vehicular communication device according to the first embodiment of the present invention, it has been configured such that access to the secure area 27 from the main control unit 23 is permitted when the main control unit 23 outputs predetermined information. However, the present invention is not limited thereto. For example, the secure area 27 may be configured to have the tamper resistance described in Non-Patent Literature 2 ("IT Glossary e-Words", [online], [searched on May 1, 2017], Internet <URL: http://e-words.jp/w/tamper resistance.html>). Here, the tamper resistance represents the difficulty of analyzing the internal structure, data, and the like of software and hardware. In other words, the tamper resistance is an ability to prevent sensitive data from being read by unauthorized means. In this example, information such as the emergency communication destination information, the emergency operation information, and the contractor information are stored in the secure area 27 having the tamper resistance so that analysis becomes difficult. Specifically, the communication destination information or the emergency operation information is, for example, encrypted by the secure control unit 28 in the secure IC 52 and stored in the secure area 27. In response to a request from the main control unit 23 in the main IC 51, the secure control unit 28 acquires and decrypts the communication destination information or the emergency operation information from the secure area 27 and outputs the decrypted communication destination information or emergency operation information to the main control unit 23. As described above, with the configuration where the communication destination information or the emergency operation information is encrypted and stored in the secure area 27, it is possible to make it difficult to illegally rewrite the communication destination information or the emergency operation information from the outside. Therefore, even when unauthorized access is received, it is possible to use the communication destination information or the emergency operation information that is free of worry about rewriting.

In the extra-vehicular communication device according to the first embodiment of the present invention, the storage unit 26 has been configured to store the emergency communication destination information indicating the IP address of the driving-related external device, the IP address of the report destination external device, or the broadcast address as the communication destination. However, the present invention is not limited thereto. The storage unit 26 may be configured to store emergency communication destination information indicating as a communication destination one or a plurality of addresses different from the IP address of the driving-related external device, the IP address of the report destination external device, and the broadcast address.

Further, in the extra-vehicular communication device according to the first embodiment of the present invention, the main control unit 23 has been configured to broadcast information indicating that the target vehicle 1 has received unauthorized access when unauthorized access in the in-vehicle equipment is detected. However, the present invention is not limited thereto. In the above case, for example, the main control unit 23 may be configured to broadcast information indicating the stopping of the target vehicle 1.

Further, in the extra-vehicular communication device according to the first embodiment of the present invention, it has been configured such that the predetermined operation in an emergency is switching from the autonomous driving to the manual driving of the target vehicle 1. However, the present invention is not limited thereto. For example, the predetermined operation in an emergency may be configured to continue the autonomous driving of the target vehicle 1.

Further, in the extra-vehicular communication device according to the first embodiment of the present invention, it has been configured such that the predetermined operation in an emergency is stopping the target vehicle 1 on the road shoulder. However, the present invention is not limited thereto. For example, the predetermined operation in an emergency may be configured to stop the target vehicle 1 at a place except for the road shoulder.

Further, in the extra-vehicular communication device according to the first embodiment of the present invention, the secure area 27 has been configured to be included in the storage area of the SIM card. However, the present invention is not limited thereto. The secure area 27 may be configured to be included in a secure device different from the SIM card, specifically an embedded SIM (eSIM), a secure device in conformity with a predetermined standard, or the like.

More specifically, for example, the eSIM is rewritable for contractor information from the inside or outside of the extra-vehicular communication device 101 and is soldered to the extra-vehicular communication device 101. The predetermined standard is, for example, a trusted platform module (TPM) version 2.0 standard, a secure hardware extension (SHE) standard, an e-safety vehicle intrusion protected applications (EVITA) standard, or the like.

Further, in the extra-vehicular communication device according to the first embodiment of the present invention, it has been configured such that the contractor information, the emergency communication destination information, and the emergency operation information are stored in the secure area 27 included in the SIM card. However, the present invention is not limited thereto. It may be configured such that the contractor information, the emergency communication destination information, and the emergency operation information are distributed and stored in a plurality of secure areas. Specifically, for example, it may be configured such that the contractor information is stored in the secure area 27 included in the SIM card, and the emergency communication destination information and the emergency operation information are stored in the secure area included in a secure device different from the SIM card.

By the way, for example, when the in-vehicle network described in Patent Literature 1 is connected to an external network outside the vehicle, an extra-vehicular communication device for communicating with the external network may be provided in the vehicle. In this case, it is conceivable that the extra-vehicular communication device may receive an unauthorized access such as hacking from the outside of the vehicle, and a technique for performing appropriate processing as the extra-vehicular communication device is required when such unauthorized access is received.

In contrast, the extra-vehicular communication device according to the first embodiment of the present invention is installed in the target vehicle 1 and can communicate with an external device outside the target vehicle 1. The storage unit 26 includes the secure area 27 having tamper resistance, and at least one of emergency communication destination information regarding a communication destination outside the target vehicle 1 and emergency operation information regarding a predetermined operation in an emergency is stored in the secure area 27. Then, when unauthorized access in the in-vehicle equipment installed in the target vehicle 1 is detected, the main control unit 23 performs at least one of control of communication with the communication destination by use of the emergency communication destination information and processing based on the emergency operation information.

As thus described, for example, with the configuration where at least one of the emergency communication destination information and the emergency operation information necessary for processing that should be performed when unauthorized access is received is stored in the secure area 27 that is difficult to rewrite from the outside of the target vehicle 1, even when unauthorized access is received, information that is free of worry about rewriting due to unauthorized access can be acquired from the secure area 27, so that it is possible to reliably perform at least one of communication with the assumed communication destination and assumed processing. Therefore, in the in-vehicle network 10, appropriate processing can be more reliably performed even when unauthorized access is received. In addition, when unauthorized access is received, with the configuration to perform communication with the communication destination by use of the emergency communication destination information, it is possible to ensure transmission of information necessary to deal with the unauthorized access as compared to, for example, a configuration where communication with the external device is completely blocked when unauthorized access is received.

The extra-vehicular communication device according to the first embodiment of the present invention is installed in the target vehicle 1 and can communicate with the external device outside the target vehicle 1. The storage unit 26 has the secure area 27 to which access from the main control unit 23 is permitted when the main control unit 23 outputs predetermined information, and at least one of emergency communication destination information regarding a communication destination outside the target vehicle 1 and emergency operation information regarding a predetermined operation in an emergency is stored in the secure area 27. Then, when unauthorized access in the in-vehicle equipment installed in the target vehicle 1 is detected, the main control unit 23 performs at least one of control of communication with the communication destination by use of the emergency communication destination information and processing based on the emergency operation information.

As thus described, for example, with the configuration where at least one of the emergency communication destination information and the emergency operation information necessary for processing that should be performed when unauthorized access is received is stored in the secure area 27 that is difficult to rewrite from the outside of the target vehicle 1, even when unauthorized access is received, information that is free of worry about rewriting due to unauthorized access can be acquired from the secure area 27, so that it is possible to reliably perform at least one of communication with the assumed communication destination and assumed processing. Therefore, in the in-vehicle network 10, appropriate processing can be more reliably performed even when unauthorized access is received. In addition, when unauthorized access is received, with the configuration to perform communication with the communication destination by use of the emergency communication destination information, it is possible to ensure transmission of information necessary to deal with the unauthorized access as compared to, for example, a configuration where communication with the external device is completely blocked when unauthorized access is received.

In the extra-vehicular communication device according to the first embodiment of the present invention, the communication destination is the driving-related external device that transmits information necessary for the autonomous driving of the target vehicle 1.

With such a configuration, transmission of information exchanged with the driving-related external device that transmits information necessary for autonomous driving of the target vehicle 1 can be ensured, thereby contributing to the continuation of autonomous driving of the target vehicle 1 when unauthorized access is received.

Further, in the extra-vehicular communication device according to the first embodiment of the present invention, the communication destination is the report destination external device of the emergency-report receiving organization.

With such a configuration, it is possible to more reliably notify the emergency-report receiving organization that the target vehicle 1 has received unauthorized access, and the like.

In addition, in the extra-vehicular communication device according to the first embodiment of the present invention, the communication destination indicates a broadcast.

For example, in a case where a communication destination is specified, when it is difficult for the communication destination to receive information from the extra-vehicular communication device 101, information cannot be transmitted from the extra-vehicular communication device 101 to the outside of the vehicle. On the other hand, with the configuration as described above where the communication destination is not specified, it is possible to more reliably transmit information to the outside of the vehicle.

In the extra-vehicular communication device according to the first embodiment of the present invention, information indicating that the target vehicle 1 has received unauthorized access is broadcast as communication with the communication destination by use of the emergency communication destination information.

With such a configuration, it is possible to broadcast to any device that the target vehicle 1 has received unauthorized access.

Further, in the extra-vehicular communication device according to the first embodiment of the present invention, the predetermined operation in an emergency is communication with at least one of the external device and the in-vehicle equipment.

With such a configuration, even in a situation where unauthorized access likely to impair communication reliability is received, it is possible to perform communication satisfactorily with at least one of the external device and the in-vehicle equipment based on the emergency operation information in the secure area 27 that is free of worry about rewriting due to unauthorized access.

Further, in the extra-vehicular communication device according to the first embodiment of the present invention, the predetermined operation in an emergency has been switching from the autonomous driving to the manual driving of the target vehicle 1.

As thus described, in a situation where unauthorized access likely to impair the reliability of autonomous driving of the target vehicle 1 is received, with the configuration to switch from the autonomous driving to manual driving, the driver can control the target vehicle 1, and it is thus possible to maintain satisfactory driving of the target vehicle 1 even when unauthorized access is received.

Further, in the extra-vehicular communication device according to the first embodiment of the present invention, the predetermined operation in an emergency is stopping the target vehicle 1 on the road shoulder.

As thus described, in a situation where unauthorized access likely to impair the reliability of the autonomous driving of the target vehicle 1 is received, with the configuration where the target vehicle 1 is stopped on a road shoulder, it is possible to ensure the safety of the target vehicle 1 and prevent continuation of the autonomous driving with low reliability.

Further, in the extra-vehicular communication device according to the first embodiment of the present invention, the secure area 27 has been included in the storage area of the secure device.

As described above, for example, with the configuration to use the secure area 27 in a general-purpose secure device, it is possible to easily ensure the secure area 27 in the extra-vehicular communication device 101.

Next, another embodiment of the present invention will be described with reference to the drawings. In the drawings, the same or corresponding portions are denoted by the same reference numerals, and description thereof will not be repeated.

Second Embodiment

The present embodiment relates to an extra-vehicular communication device in which a secure control unit controls a communication LSI in an emergency as compared to the extra-vehicular communication device according to the first embodiment. The contents except for those described below are the same as the extra-vehicular communication device according to the first embodiment.

Figure 9:
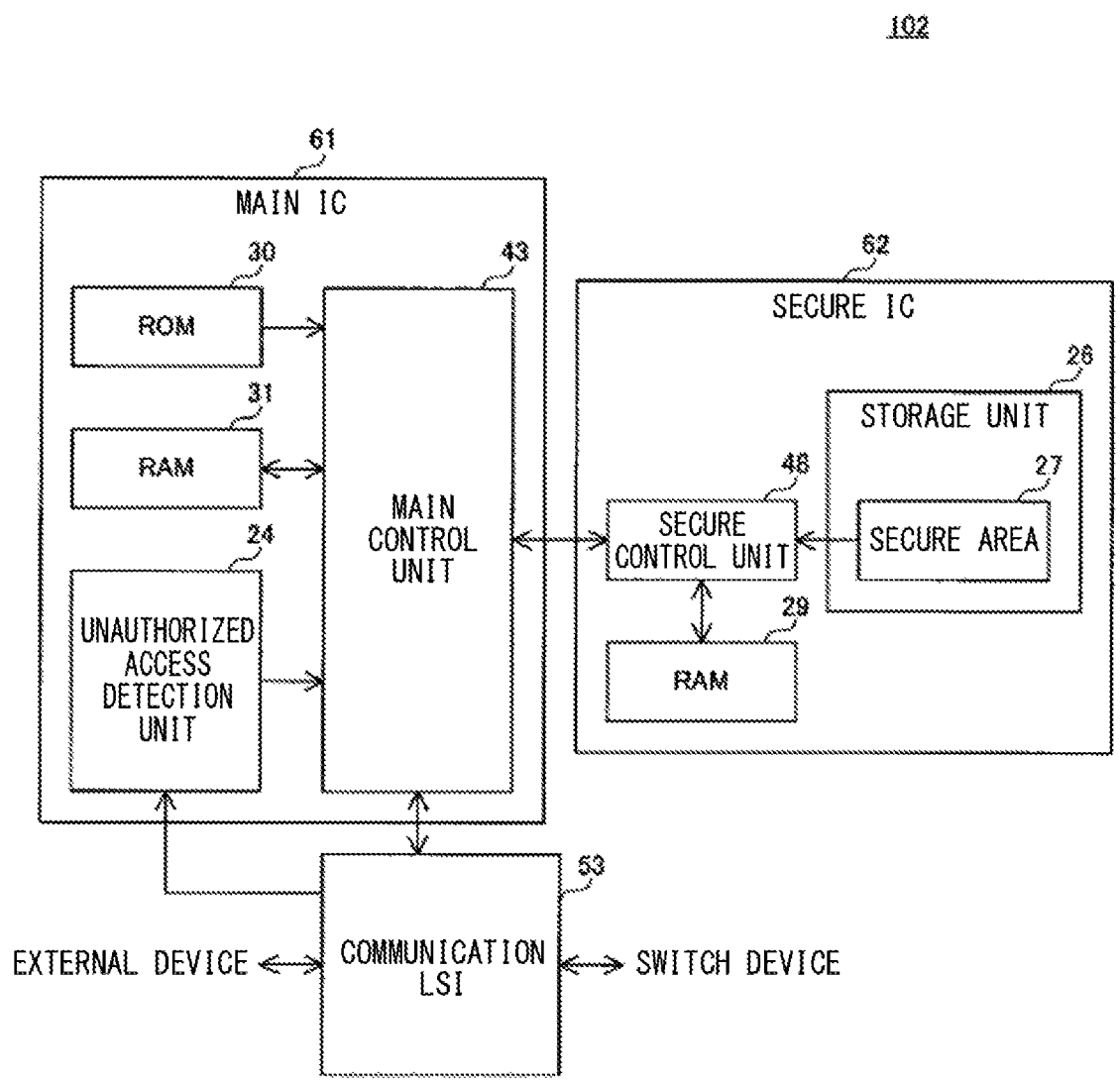
FIG. 9 is a diagram showing a configuration of an extra-vehicular communication device in an in-vehicle communication system according to a second embodiment of the present invention.

FIG. 9 is a diagram showing a configuration of an extra-vehicular communication device in an in-vehicle communication system according to a second embodiment of the present invention.

Referring to FIG. 9, an extra-vehicular communication device 102 includes a main IC 61, a secure IC 62, and a communication LSI 53. The main IC 61 includes an unauthorized access detection unit 24, a ROM (storage unit) 30, a RAM 31, and a main control unit 43. The secure IC 62 includes a storage unit (secure storage unit) 26, a RAM 29, and a secure control unit 48. The storage unit 26 includes a secure area 27. The secure IC 62 is an example of a secure device, specifically a SIM card.

The operations of the unauthorized access detection unit 24, the storage unit 26, the secure area 27, the RAM 29, the ROM 30, the RAM 31, and the communication LSI 53 in the extra-vehicular communication device 102 are the same as the operations of the unauthorized access detection unit 24, the storage unit 26, the secure area 27, the RAM 29, the ROM 30, the RAM 31, and the communication LSI 53 in the extra-vehicular communication device 101 shown in FIG. 2.

The ROM 30 stores normal-time operation information regarding a predetermined operation in a normal time. More specifically, the normal-time operation information includes, for example, a main external communication program and a main internal communication program as main programs.

The storage unit 26 stores emergency operation information and contractor information in the secure area 27. In this example, the emergency operation information includes, for example, an emergency external communication program and an emergency internal communication program as emergency programs.

Access to the secure area 27 from the main control unit 43 is permitted when the main control unit 43 outputs predetermined information.

In this example, the secure area 27 is accessible from the main control unit 43 when the main control unit 43 follows a predetermined procedure P1, and is not accessible when the main control unit 43 does not follow the procedure P1.

The extra-vehicular communication device 102 operates in a normal mode when receiving no unauthorized access, and the extra-vehicular communication device 102 operates in an emergency mode when receiving unauthorized access.

[Flow of Operation]

Figure 10:
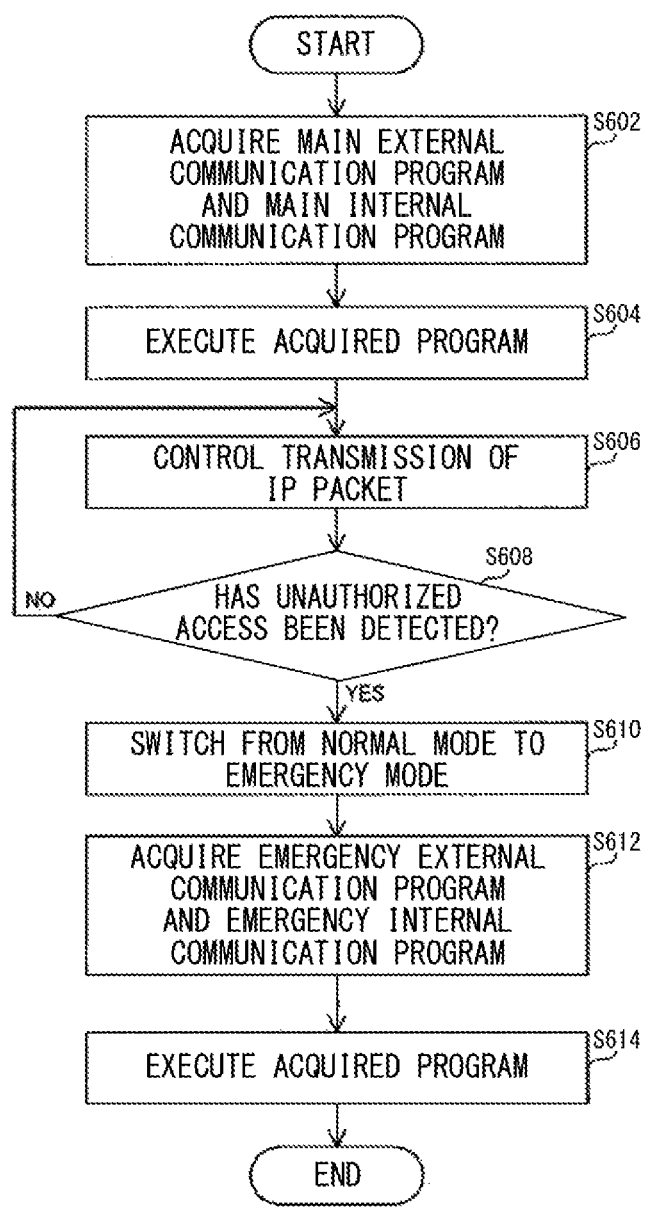
FIG. 10 is a flowchart defining an operation procedure of each processing that is performed when the extra-vehicular communication device according to the second embodiment of the present invention detects unauthorized access.

FIG. 10 is a flowchart defining an operation procedure of each processing that is performed when the extra-vehicular communication device according to the second embodiment of the present invention detects unauthorized access.

Referring to FIG. 10, for example, a situation is assumed where the power supply of the extra-vehicular communication device 102 is turned on, and the extra-vehicular communication device 102 operates in the normal mode.

First, the extra-vehicular communication device 102 acquires a main external communication program and a main internal communication program from the ROM 30 (step S602).

More specifically, for example, when the power supply of the own extra-vehicular communication device 102 is turned on, the main control unit 43 acquires the main external communication program and the main internal communication program from the ROM 30.

Next, the extra-vehicular communication device 102 executes the acquired main external communication program and main internal communication program (step S604).

More specifically, the main control unit 43 performs processing based on normal-time operation information. Specifically, the main control unit 43 initializes the communication data processing unit 22 in the communication LSI 53 in accordance with the main internal communication program and the main external communication program.

Then, the main control unit 43 establishes a communication connection with the carrier server 183 in accordance with the main external communication program, for example.

Next, when the extra-vehicular communication device 102 has not detected unauthorized access in the in-vehicle equipment (NO in step S608), the extra-vehicular communication device 102 performs the IP packet transmission processing (step S606). In this case, the communication path of the IP packet transmitted and received by the communication data processing unit 22 is not limited.

On the other hand, when detecting unauthorized access in the in-vehicle equipment (YES in step S608), the extra-vehicular communication device 102 switches from the normal mode to the emergency mode.

More specifically, when receiving the determination information from the unauthorized access detection unit 24, the main control unit 43 outputs a control change request to the secure control unit 48 and shifts itself to a bypass state.

In the bypass state, the main control unit 43 bypasses a command received from the secure control unit 48 to the communication LSI 53. In addition, the main control unit 43 bypasses various pieces of information from the communication LSI 53 to the secure control unit 48.

Next, the extra-vehicular communication device 102 acquires the emergency operation information, specifically the emergency external communication program and the emergency internal communication program, from the secure area 27 in the storage unit 26 (step S612).

Specifically, the secure control unit 48 can access the secure area 27, and when unauthorized access in the in-vehicle equipment installed in the target vehicle 1 is detected, the secure control unit 48 performs processing based on the emergency operation information instead of the main control unit 43.

More specifically, when receiving the control change request from the main control unit 43, the secure control unit 48 controls the communication LSI 53 via the main control unit 43 in the bypass state in accordance with the received control change request.

Specifically, the secure control unit 48 acquires the emergency external communication program and the emergency internal communication program from the secure area 27.

Next, the extra-vehicular communication device 102 executes the acquired emergency external communication program and the emergency internal communication program (step S614).

More specifically, the secure control unit 48 causes the communication LSI 53 to perform transmission/reception of information with the external device and transmission/reception of information with the in-vehicle equipment at a minimum in accordance with the acquired emergency external communication program and emergency internal communication program.

In this case, the communication path of the IP packet transmitted and received by the communication data processing unit 22 is not limited.

With such a configuration, even when unauthorized access is received, the extra-vehicular communication device 102 can more safely communicate with an unspecified external device by use of a safe program stored in the secure area 27.

Note that the secure control unit 48 in the extra-vehicular communication device 102 is has been configured to acquire the emergency external communication program and the emergency internal communication program from the secure area 27 in the storage unit 26 in step S612. However, the present invention is not limited thereto. For example, when the emergency program stored in the secure area 27 is one of the emergency external communication program and the emergency internal communication program, the secure control unit 48 may be configured to acquire one of the stored emergency external communication program and emergency internal communication program In this case, the secure control unit 48 causes the communication LSI 53 to perform one of transmission/reception of information with the external device and transmission/reception of information with the in-vehicle equipment at a minimum.

[First Modification of Communication Control in Emergency]

The extra-vehicular communication device 102 is not limited to the configuration to communicate with an unspecified external device at the time of occurrence of unauthorized access, but may be configured to limit the communication destination to a specific external device.

Referring to FIG. 9 again, in this example, the storage unit 26 stores, in the secure area 27, emergency communication destination information, emergency operation information, and contractor information regarding an emergency communication destination outside the target vehicle 1.

The emergency communication destination information includes, for example, the IP address of the map server 184 and the IP address of the control server 185 as the addresses of the driving-related external devices. The emergency operation information includes an emergency transmission restriction program as an emergency program.

[Flow of Operation]

Figure 11:
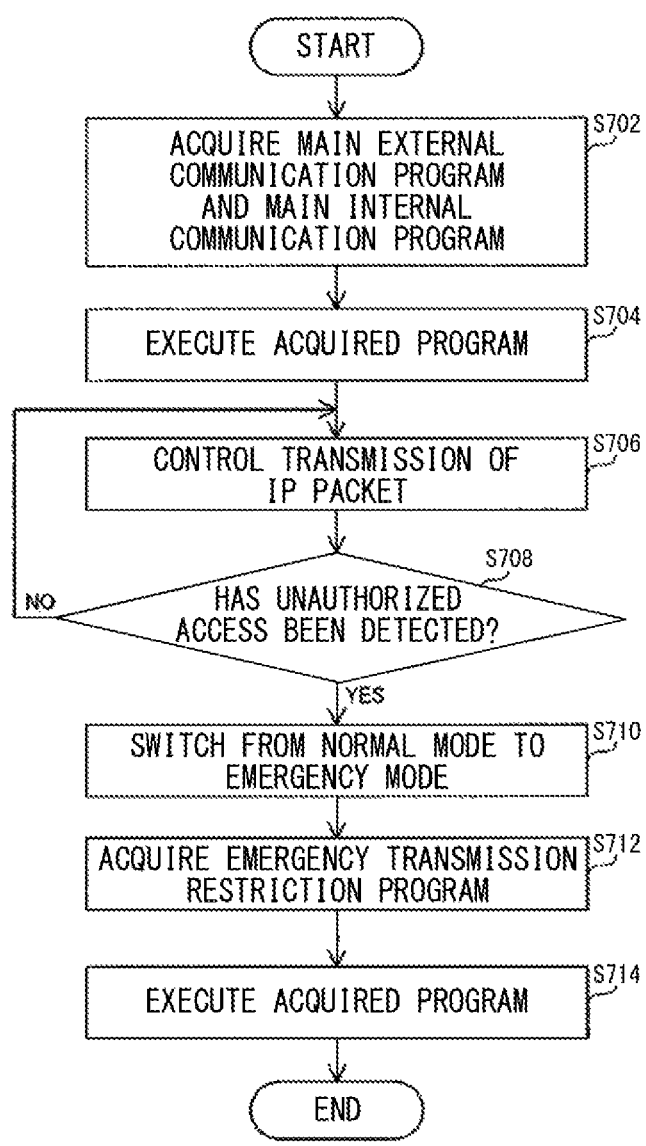
FIG. 11 is a flowchart defining an operation procedure of each processing that is performed when the extra-vehicular communication device according to the second embodiment of the present invention detects unauthorized access.

FIG. 11 is a flowchart defining an operation procedure of each processing that is performed when the extra-vehicular communication device according to the second embodiment of the present invention detects unauthorized access.

Referring to FIG. 11, for example, a situation is assumed where the power supply of the extra-vehicular communication device 102 is turned on, the extra-vehicular communication device 102 operates in the normal mode, the main control unit 43 sets the mode to the continuous mode, and autonomous driving is performed in the target vehicle 1.

The operations in steps S702 to S710 are the same as the operations in steps S602 to S610 shown in FIG. 10.

Next, the extra-vehicular communication device 102 acquires the emergency operation information, specifically the emergency transmission restriction program, from the secure area 27 in the storage unit 26 (step S712).

Specifically, when unauthorized access in the in-vehicle equipment installed in the target vehicle 1 is detected, the secure control unit 48 performs control of communication with the communication destination by use of the emergency communication destination information and processing based on the emergency operation information, instead of the main control unit 43.

More specifically, when receiving a control change request from the main control unit 43, the secure control unit 48 acquires the emergency transmission restriction program from the secure area 27.

Next, the extra-vehicular communication device 102 executes the acquired emergency transmission restriction program (step S714).

More specifically, the secure control unit 48 operates in accordance with the acquired emergency transmission restriction program and acquires the emergency communication destination information from the secure area 27.

Then, the secure control unit 48 restricts the IP packet relayed by the communication LSI 53 to an IP packet with its destination being the communication destination indicated by the emergency communication destination information, and an IP packet with its destination being the destination indicated by the emergency destination information.

With such a configuration, when unauthorized access occurs among control information, map information, text information, image information, moving image information, audio information, and the like that are transmitted in a normal time, it is possible to more reliably restrict transmission of information except for the control information and the map information that are necessary for the autonomous driving of the target vehicle 1, so that the autonomous driving can be continued more satisfactorily.

[Second Modification of Communication Control in Emergency]

The extra-vehicular communication device 102 is not limited to the configuration to communicate with an unspecified external device when unauthorized access occurs, but may be configured to notify a predetermined communication destination that unauthorized access has been received.

Referring to FIG. 9 again, in this example, the storage unit 26 stores emergency communication destination information, emergency operation information, and contractor information in secure area 27.

The emergency communication destination information includes the IP address of the report destination server 182 as the address of the report destination external device. The emergency operation information includes an emergency report program as an emergency program.

[Flow of Operation]

Figure 12:
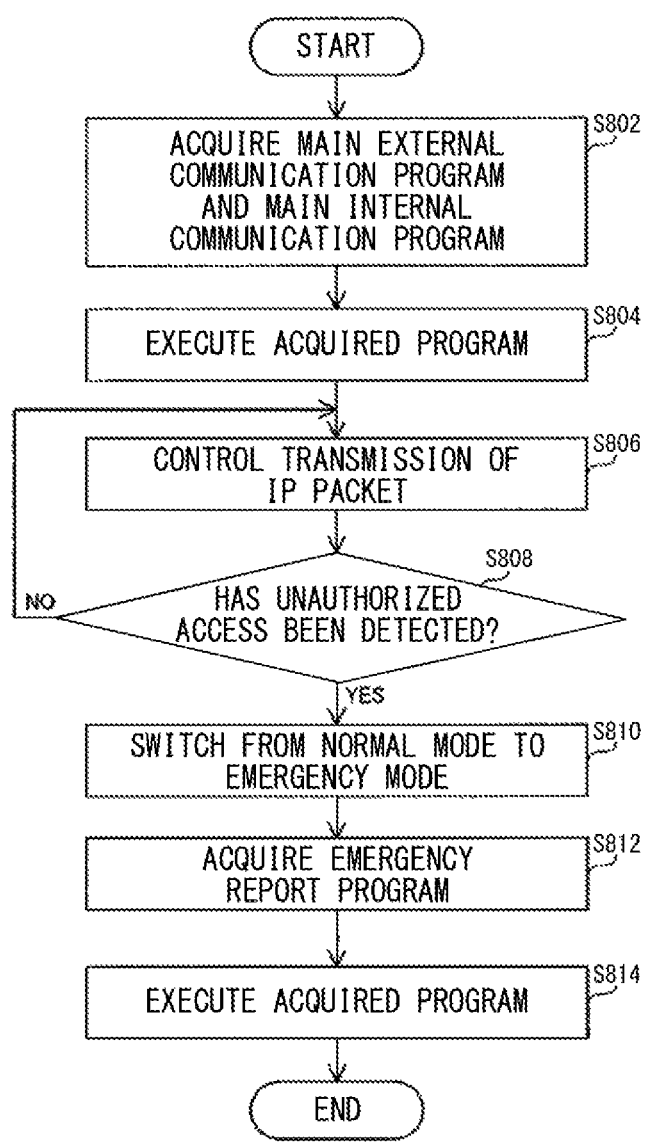
FIG. 12 is a flowchart defining an operation procedure of each processing that is performed when the extra-vehicular communication device according to the second embodiment of the present invention detects unauthorized access.

FIG. 12 is a flowchart defining an operation procedure of each processing that is performed when the extra-vehicular communication device according to the second embodiment of the present invention detects unauthorized access.

Referring to FIG. 12, for example, a situation is assumed where the power supply of the extra-vehicular communication device 102 is turned on, and the extra-vehicular communication device 102 operates in the normal mode.

The operations in steps S802 to S810 are the same as the operations in steps S602 to S610 shown in FIG. 10.

Next, the extra-vehicular communication device 102 acquires emergency operation information, specifically the emergency report program, from the secure area 27 in the storage unit 26 (step S812).

More specifically, when receiving a control change request from the main control unit 43, the secure control unit 48 acquires the emergency report program from the secure area 27.

Next, the extra-vehicular communication device 102 executes the acquired emergency report program (step S814).

More specifically, the secure control unit 48 operates in accordance with the acquired emergency report program and acquires the emergency communication destination information from the secure area 27.

Then, for example, the secure control unit 48 creates emergency-notification information indicating that unauthorized access has occurred in the target vehicle 1 and creates an IP packet including the created emergency-notification information in a payload.

The secure control unit 48 sets the destination IP address of the created IP packet as the IP address of the report destination server 182 included in the emergency communication destination information and causes the communication LSI 53 to transmit the IP packet to the report destination server 182.

[Third Modification of Communication Control in Emergency]

The extra-vehicular communication device 102 is not limited to the configuration to communicate with an unspecified external device at the time of occurrence of unauthorized access, but may be configured to broadcast the occurrence of unauthorized access.

Referring to FIG. 9 again, in this example, the storage unit 26 stores emergency communication destination information, emergency operation information, and contractor information in secure area 27.

The emergency communication destination information indicates, for example, a broadcast address as a communication destination that indicates a broadcast. The emergency operation information includes an emergency surrounding broadcast program as an emergency program.

[Flow of Operation]

Figure 13:
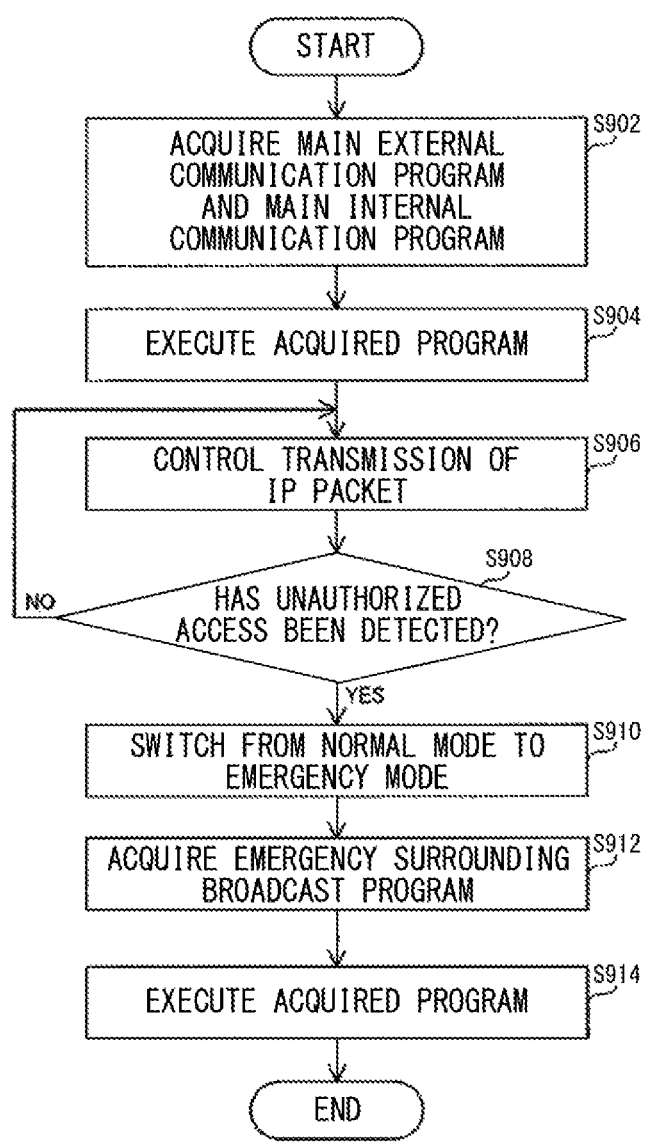
FIG. 13 is a flowchart defining an operation procedure of each processing that is performed when the extra-vehicular communication device according to the second embodiment of the present invention detects unauthorized access.

FIG. 13 is a flowchart defining an operation procedure of each processing that is performed when the extra-vehicular communication device according to the second embodiment of the present invention detects unauthorized access.

Referring to FIG. 13, for example, a situation is assumed where the power supply of the extra-vehicular communication device 102 is turned on, and the extra-vehicular communication device 102 operates in the normal mode.

The operations in steps S902 to S910 are the same as the operations in steps S602 to S610 shown in FIG. 10

Next, the extra-vehicular communication device 102 acquires the emergency operation information, specifically the emergency surrounding broadcast program, from the secure area 27 in the storage unit 26 (step S912).

More specifically, when receiving a control change request from the main control unit 43, the secure control unit 48 acquires the emergency surrounding broadcast program from the secure area 27.

Next, the extra-vehicular communication device 102 executes the acquired emergency surrounding broadcast program (step S914).

More specifically, the secure control unit 48 operates in accordance with the acquired emergency surrounding broadcast program and acquires the emergency communication destination information from the secure area 27.

Then, the secure control unit 48 creates surrounding notification information indicating that unauthorized access has occurred in the target vehicle 1 and creates an IP packet including the created surrounding notification information in the payload.

The secure control unit 48 sets the destination IP address of the created IP packet as the broadcast address indicated by the emergency communication destination information and causes the communication LSI 53 to broadcast the IP packet to the report destination server 182.

[Control of Autonomous Driving in Emergency]

The extra-vehicular communication device 102 is not limited to the configuration to communicate with an unspecified external device at the time of occurrence of unauthorized access, but may be configured to control the autonomous driving of the own target vehicle 1.

Referring to FIG. 9 again, in this example, the storage unit 26 stores the emergency operation information, and the contractor information into secure area 27.

The emergency operation information includes an emergency driving instruction program and an emergency driving switching program as emergency programs.

[Flow of Operation]

Figure 14:
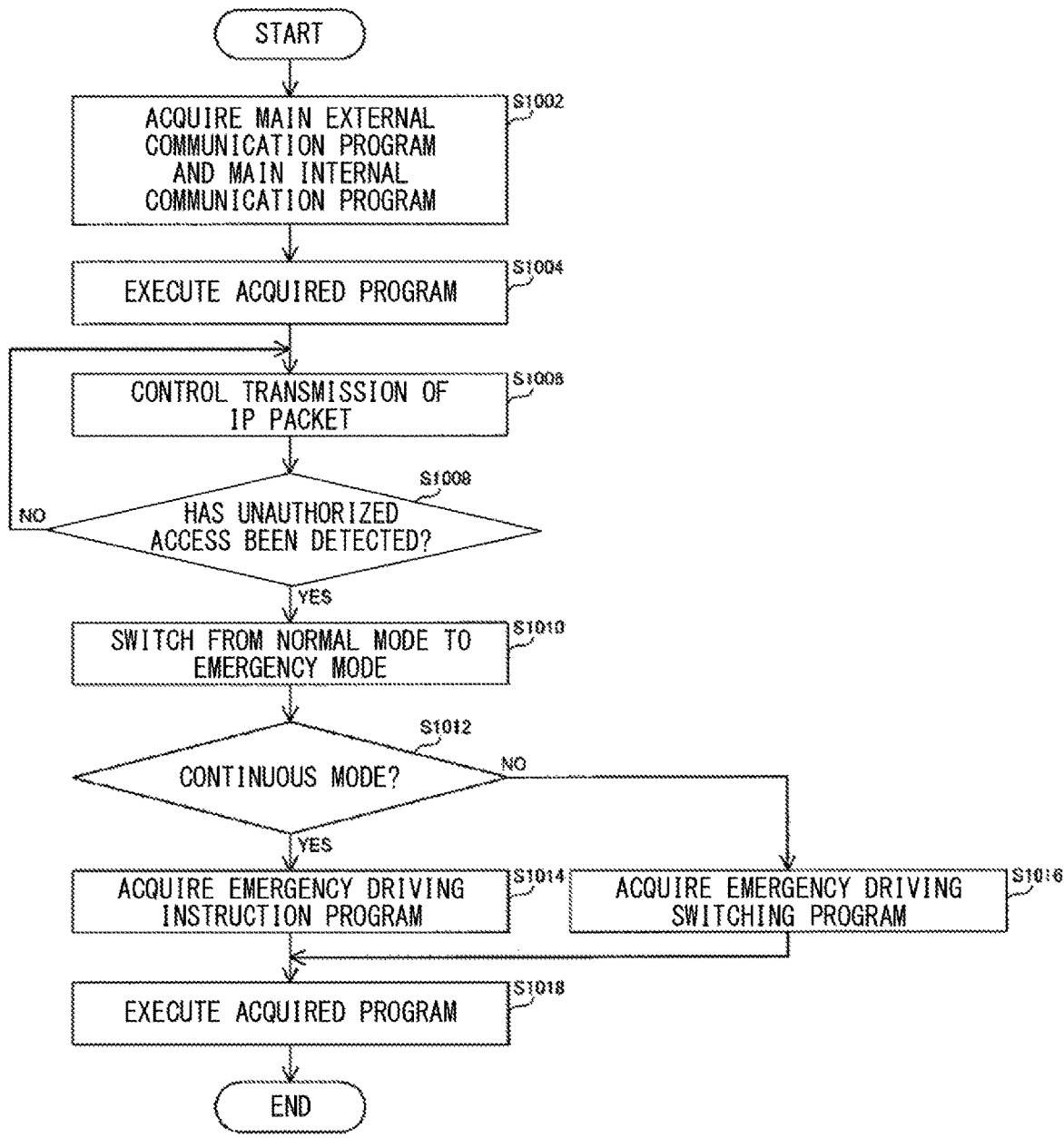
FIG. 14 is a flowchart defining an operation procedure of each processing that is performed when the extra-vehicular communication device according to the second embodiment of the present invention detects unauthorized access.

FIG. 14 is a flowchart defining an operation procedure of each processing that is performed when the extra-vehicular communication device according to the second embodiment of the present invention detects unauthorized access.

Referring to FIG. 14, for example, a situation is assumed where the power supply of the extra-vehicular communication device 102 is turned on, and the extra-vehicular communication device 102 operates in the normal mode.

The operations in steps S1002 to S1010 are the same as the operations in steps S602 to S610 shown in FIG. 10

Next, when the continuous mode has been set (YES in step S1012), the extra-vehicular communication device 102 acquires emergency operation information, specifically the emergency driving instruction program, from the secure area 27 in the storage unit 26 (step S1014).

More specifically, when the continuous mode has been set, upon reception of a control change request from the main control unit 43, the secure control unit 48 acquires the emergency driving instruction program from the secure area 27.

On the other hand, when the non-continuous mode has been set (NO in step S1012), the extra-vehicular communication device 102 acquires emergency operation information, specifically the emergency driving switching program, from the secure area 27 in the storage unit 26 (step S1016).

More specifically, when the non-continuous mode has been set, upon reception of a control change request from the main control unit 43, the secure control unit 48 acquires the emergency driving switching program from the secure area 27.

Next, the extra-vehicular communication device 102 executes the acquired emergency driving instruction program or emergency driving switching program (step S1018).

More specifically, when acquiring the emergency driving instruction program from the secure area 27, the secure control unit 48 operates in accordance with the emergency driving instruction program and creates an IP packet including in the payload a road shoulder stop command that indicates stopping of the target vehicle 1 on the road shoulder.

The secure control unit 48 sets the destination IP address of the created IP packet as the IP address of the autonomous driving ECU 112 and causes the communication LSI 53 to transmit the IP packet to the autonomous driving ECU 112.

Further, the secure control unit 48 creates status information indicating the stopping of the target vehicle 1 on the road shoulder due to occurrence of unauthorized access and creates an IP packet including the created status information in the payload.

The secure control unit 48 sets the destination IP address of the created IP packet as the IP address of the instrument display controller described above and causes the communication LSI 53 to transmit the IP packet to the instrument display controller.

On the other hand, when acquiring the emergency driving switching program from the secure area 27, the secure control unit 48 operates in accordance with the emergency driving switching program and creates an IP packet including a manual driving switching command in the payload.

The secure control unit 48 sets the destination IP address of the created IP packet as the IP address of the autonomous driving ECU 112 and causes the communication LSI 53 to transmit the IP packet to the autonomous driving ECU 112.

Further, the secure control unit 48 creates status information indicating the switching from the autonomous driving to the manual driving due to occurrence of unauthorized access and creates an IP packet including the created status information in the payload.

The secure control unit 48 sets the destination IP address of the created IP packet as the IP address of the instrument display controller and causes the communication LSI 53 to transmit the IP packet to the instrument display controller.

In the extra-vehicular communication device according to the second embodiment of the present invention, the main control unit 23 has been configured to perform processing based on the emergency operation information, or perform communication with the communication destination by use of the emergency communication destination information and processing based on the emergency operation information, when unauthorized access in the in-vehicle equipment is detected. However, the present invention is not limited thereto. The main control unit 23 may be configured to perform communication with the communication destination by use of the emergency communication destination information when the unauthorized access is detected.

As described above, the extra-vehicular communication device according to the second embodiment of the present invention is installed in the target vehicle 1 and can communicate with the external device outside the target vehicle 1. The ROM 30 stores normal-time operation information regarding a predetermined operation in a normal time. The main control unit 43 performs processing based on normal-time operation information. The storage unit 26 includes the secure area 27 having tamper resistance, and at least one of emergency communication destination information regarding a communication destination outside the target vehicle 1 and emergency operation information regarding a predetermined operation in an emergency is stored in the secure area 27. The secure control unit 48 can access the secure area 27, and when unauthorized access in the in-vehicle equipment installed in the target vehicle 1 is detected, the secure control unit 48 performs at least one of control of communication with the communication destination by use of the emergency communication destination information and processing based on the emergency operation information, instead of the main control unit 43.

As thus described, for example, with the configuration where at least one of the emergency communication destination information and the emergency operation information necessary for processing that should be performed when unauthorized access is received is stored in the secure area 27 accessible by the secure control unit 48 and the secure control unit 48 performs control instead of the main control unit 43 when unauthorized access is detected, even when unauthorized access is received, the secure control unit 48 that is difficult for an unauthorized operation from the outside can reliably perform at least one of communication with the assumed communication destination and the assumed processing by use of the information in the secure area 27 that is free of worry about rewriting due to access. Therefore, in the in-vehicle network, appropriate processing can be more reliably performed even when unauthorized access is received. In addition, when unauthorized access is received, with the configuration to perform communication with the communication destination by use of the emergency communication destination information, it is possible to ensure transmission of information necessary to deal with the unauthorized access as compared to, for example, a configuration where communication with the external device is completely blocked when unauthorized access is received.

The extra-vehicular communication device according to the second embodiment of the present invention is installed in the target vehicle 1 and can communicate with the external device outside the target vehicle 1. The ROM 30 stores normal-time operation information regarding a predetermined operation in a normal time. The main control unit 43 performs processing based on normal-time operation information. The storage unit 26 includes the secure area 27, and at least one of emergency communication destination information regarding a communication destination outside the target vehicle 1 and emergency operation information regarding a predetermined operation in an emergency is stored in the secure area 27. The secure control unit 48 can access the secure area 27, and when unauthorized access in the in-vehicle equipment installed in the target vehicle 1 is detected, the secure control unit 48 performs at least one of control of communication with the communication destination by use of the emergency communication destination information and processing based on the emergency operation information, instead of the main control unit 43.

As thus described, for example, with the configuration where at least one of the emergency communication destination information and the emergency operation information necessary for processing that should be performed when unauthorized access is received is stored in the secure area 27 accessible by the secure control unit 48 and the secure control unit 48 performs control instead of the main control unit 43 when unauthorized access is detected, even when unauthorized access is received, the secure control unit 48 that is difficult for an unauthorized operation from the outside can reliably perform at least one of communication with the assumed communication destination and the assumed processing by use of the information in the secure area 27 that is free of worry about rewriting due to access. Therefore, in the in-vehicle network, appropriate processing can be more reliably performed even when unauthorized access is received. In addition, when unauthorized access is received, with the configuration to perform communication with the communication destination by use of the emergency communication destination information, it is possible to ensure transmission of information necessary to deal with the unauthorized access as compared to, for example, a configuration where communication with the external device is completely blocked when unauthorized access is received.

The other configurations and operations are the same as those of the extra-vehicular communication device according to the first embodiment, and hence the detailed description thereof will not be repeated here.

Note that some or all of the components and operations of the devices according to the first embodiment and the second embodiment of the present invention may be combined as appropriate.

Note that the embodiments disclosed herein should be considered as illustrative and not restrictive in every respect. The scope of the present invention is shown not by the meanings described above but by the claims and is intended to include all modifications within the meanings and the scope equivalent to the claims.

The above description includes the following features.

[Additional Note 1]

An extra-vehicular communication device installed in a vehicle and capable of communicating with an external device outside the vehicle, the extra-vehicular communication device including: a control unit; and a storage unit that has a tamper-resistant secure area and stores, in the secure area, at least one of communication destination information regarding a communication destination outside the vehicle and emergency operation information regarding a predetermined operation in an emergency. The control unit performs at least one of control of communication with the communication destination by use of the communication destination information and processing based on the emergency operation information when unauthorized access in in-vehicle equipment installed in the vehicle is detected. The external device is an in-vehicle communication device in a report destination server, a carrier server, a map server, a control server, a general server, or another vehicle. The predetermined operation in an emergency is to switch from autonomous driving to manual driving of the vehicle, or to stop the vehicle on a road shoulder. The secure area is included in a storage area of an embedded subscriber identity module (eSIM), a storage area of a SIM card, or a storage area of a security integrated circuit (IC) in conformity with a trusted platform module (TPM) version 2.0 standard, a secure hardware extension (SHE) standard, or an e-safety vehicle intrusion protected applications (EVITA) standard.

[Additional Note 2]

An extra-vehicular communication device installed in a vehicle and capable of communicating with an external device outside the vehicle, the extra-vehicular communication device including: a storage unit that stores normal-time operation information regarding a predetermined operation in a normal time; a main control unit that performs processing based on the normal-time operation information; a secure storage unit that has a tamper-resistant secure area and stores, in the secure area, at least one of communication destination information regarding a communication destination outside the vehicle and emergency operation information regarding a predetermined operation in an emergency; and a secure control unit that is capable of accessing the secure area and performs, instead of the main control unit, at least one of control of communication with the communication destination by use of the communication destination information and processing based on the emergency operation information when unauthorized access in in-vehicle equipment installed in the vehicle is detected. The external device is an in-vehicle communication device in a report destination server, a carrier server, a map server, a control server, a general server, or another vehicle. The predetermined operation in an emergency is to switch from autonomous driving to manual driving of the vehicle, or to stop the vehicle on a road shoulder. The secure control unit and the secure storage unit are included in a secure device. The main control unit and the storage unit are included in an IC different from the secure device. The storage unit is a read only memory (ROM). The secure device is an eSIM, a SIM card, or a secure IC in conformity with a TPM version 2.0 standard, a SHE standard, or an EVITA standard.

[Additional Note 3]

An extra-vehicular communication device installed in a vehicle and capable of communicating with an external device outside the vehicle, the extra-vehicular communication device including: a control unit; and a storage unit that has a secure area to which access from the control unit is permitted when the control unit outputs predetermined information, the storage unit storing, in the secure area, at least one of communication destination information regarding a communication destination outside the vehicle and emergency operation information regarding a predetermined operation in an emergency. When unauthorized access in in-vehicle equipment installed in the vehicle is detected, the control unit performs at least one of control of communication with the communication destination by use of the communication destination information and processing based on the emergency operation information.

The external device is an in-vehicle communication device in a report destination server, a carrier server, a map server, a control server, a general server, or another vehicle. The predetermined operation in an emergency is to switch from autonomous driving to manual driving of the vehicle, or to stop the vehicle on a road shoulder. The secure area is a storage area of an eSIM, a storage area of a SIM card, or a storage area of a security IC in conformity with a TPM version 2.0 standard, a SHE standard, or an EVITA standard.

[Additional Note 4]

An extra-vehicular communication device installed in a vehicle and capable of communicating with an external device outside the vehicle, the extra-vehicular communication device including: a storage unit that stores normal-time operation information regarding a predetermined operation in a normal time; a main control unit that performs processing based on the normal-time operation information; a secure storage unit that has a secure area and stores, in the secure area, at least one of communication destination information regarding a communication destination outside the vehicle and emergency operation information regarding a predetermined operation in an emergency; and a secure control unit that is capable of accessing the secure area and performs, instead of the main control unit, at least one of control of communication with the communication destination by use of the communication destination information and processing based on the emergency operation information when unauthorized access in in-vehicle equipment installed in the vehicle is detected. The external device is an in-vehicle communication device in a report destination server, a carrier server, a map server, a control server, a general server, or another vehicle. The predetermined operation in an emergency is to switch from autonomous driving to manual driving of the vehicle, or to stop the vehicle on a road shoulder. The secure control unit and the secure storage unit are included in a secure device. The main control unit and the storage unit are included in an IC different from the secure device. The storage unit is a ROM. The secure device is an eSIM, a SIM card, or a secure IC in conformity with a TPM version 2.0 standard, a SHE standard, or an EVITA standard.

REFERENCE SIGNS LIST

1: TARGET VEHICLE
2: ANOTHER VEHICLE
10: IN-VEHICLE NETWORK
11: EXTERNAL NETWORK
21: EXTRA-VEHICULAR COMMUNICATION UNIT
22: COMMUNICATION DATA PROCESSING UNIT
23: MAIN CONTROL UNIT
24: UNAUTHORIZED ACCESS DETECTOR
25: INTRA-VEHICULAR COMMUNICATION UNIT
26: STORAGE UNIT (SECURE STORAGE UNIT)
27: SECURE AREA
28: SECURE CONTROL UNIT
29: RAM
30: ROM (STORAGE UNIT)

31: RAM
43: MAIN CONTROL UNIT
48: SECURE CONTROL UNIT
51: MAIN IC
52: SECURE IC
53: COMMUNICATION LSI
61: MAIN IC
62: SECURE IC
101, 102: EXTRA-VEHICULAR COMMUNICATION DEVICE
111: IN-VEHICLE ECU
112: AUTONOMOUS DRIVING ECU
151: SWITCH DEVICE
161: WIRELESS BASE STATION EQUIPMENT
182: REPORT DESTINATION SERVER
183: CARRIER SERVER
184: MAP SERVER
185: CONTROL SERVER
186: GENERAL SERVER
187: IN-VEHICLE COMMUNICATION DEVICE
301: IN-VEHICLE COMMUNICATION SYSTEM

The invention claimed is:

1. An extra-vehicular communication device installed in a vehicle that communicates with an external device outside of the vehicle, the vehicle being configured to perform autonomous driving, the extra-vehicular communication device comprising:
   a memory that includes a tamper-resistant secure area, the memory storing, in the secure area, at least one of communication destination information regarding a communication destination outside of the vehicle and emergency operation information regarding a predetermined operation in an emergency; and
   a control circuit that:
      performs (i) control of communication with the communication destination by use of the communication destination information, and (ii) processing based on the emergency operation information when unauthorized access in in-vehicle equipment installed in the vehicle is detected, and
      upon detecting unauthorized access in the in-vehicle equipment installed in the vehicle, restricts transmission of information, except for control information and map information, which are permitted to be transmitted and are used to perform autonomous driving of the vehicle.

2. The extra-vehicular communication device according to claim 1, wherein the communication destination is the external device that transmits information necessary for autonomous driving of the vehicle.

3. The extra-vehicular communication device according to claim 1, wherein the communication destination is the external device of an emergency-report receiving organization.

4. The extra-vehicular communication device according to claim 1, wherein the communication destination indicates a broadcast.

5. The extra-vehicular communication device according to claim 4, wherein information indicating that the vehicle receives the unauthorized access is broadcast as communication with the communication destination.

6. The extra-vehicular communication device according to claim 1, wherein the predetermined operation in an emergency is communication with at least one of the external device and the in-vehicle equipment.

7. The extra-vehicular communication device according to claim 1, wherein the predetermined operation in an emergency is switching from autonomous driving to manual driving of the vehicle.

8. The extra-vehicular communication device according to claim 1, wherein the predetermined operation in an emergency is stopping the vehicle on a road shoulder.

9. The extra-vehicular communication device according to claim 1, wherein the secure area is included in a storage area of a secure device.

10. An extra-vehicular communication device installed in a vehicle that communicates with an external device outside the vehicle, the vehicle being configured to perform autonomous driving, the extra-vehicular communication device comprising:
    a first memory that stores normal-time operation information regarding a predetermined operation in a normal time;
    a main control circuit that performs processing based on the normal-time operation information;
    a secure memory that includes a tamper-resistant secure area, the memory storing, in the secure area, at least one of communication destination information regarding a communication destination outside of the vehicle and emergency operation information regarding a predetermined operation in an emergency; and
    a secure control circuit that:
       accesses the secure area,
       performs (i) control of communication with the communication destination by use of the communication destination information, and (ii) processing based on the emergency operation information when unauthorized access in in-vehicle equipment installed in the vehicle is detected, and
       upon detecting unauthorized access in the in-vehicle equipment installed in the vehicle, restricts transmission of information, except for control information and map information, which are permitted to be transmitted and are used to perform autonomous driving of the vehicle.

11. An extra-vehicular communication device installed in a vehicle that communicates with an external device outside of the vehicle, the vehicle being configured to perform autonomous driving, the extra-vehicular communication device comprising:
    a control circuit; and
    a memory that includes a secure area to which access from the control circuit is permitted when the control circuit outputs predetermined information, the memory storing, in the secure area, at least one of communication destination information regarding a communication destination outside the vehicle and emergency operation information regarding a predetermined operation in an emergency,
    wherein when unauthorized access in in-vehicle equipment installed in the vehicle is detected, the control circuit:
       performs control of communication with the communication destination by use of the communication destination information and processing based on the emergency operation information, and
       restricts transmission of information, except for control information and map information, which are permitted to be transmitted and are used to perform autonomous driving of the vehicle.

12. An extra-vehicular communication device installed in a vehicle that communicates with an external device outside the vehicle, the vehicle being configured to perform autonomous driving, the extra-vehicular communication device comprising:
- a first memory that stores normal-time operation information regarding a predetermined operation in a normal time;
- a main control circuit that performs processing based on the normal-time operation information;
- a secure memory that includes a secure area, the secure memory storing, in the secure area, at least one of communication destination information regarding a communication destination outside the vehicle and emergency operation information regarding a predetermined operation in an emergency; and
- a secure control circuit that:
  - accesses the secure area,
  - performs (i) control of communication with the communication destination by use of the communication destination information, and (ii) processing based on the emergency operation information when unauthorized access in in-vehicle equipment installed in the vehicle is detected, and
  - upon detecting unauthorized access in the in-vehicle equipment installed in the vehicle, restricts transmission of information, except for control information and map information, which are permitted to be transmitted and are used to perform autonomous driving of the vehicle.

* * * * *